(12) United States Patent
Hirsch et al.

(10) Patent No.: US 10,250,928 B2
(45) Date of Patent: Apr. 2, 2019

(54) PRICE DRIVEN MULTIMEDIA CONTENT VIDEO TIME-BANDWIDTH PRODUCT IMPROVEMENT (VTBPI) RECEPTION

(71) Applicant: Edge2020 LLC, Herndon, VA (US)

(72) Inventors: Ronald Hirsch, Herndon, VA (US); Tell Allen Gates, Great Falls, VA (US)

(73) Assignee: Edge2020, Herndon, VA (US)

( * ) Notice: Subject to any disclaimer, the term of this patent is extended or adjusted under 35 U.S.C. 154(b) by 394 days.

(21) Appl. No.: 15/135,273

(22) Filed: Apr. 21, 2016

(65) Prior Publication Data

US 2016/0315981 A1 Oct. 27, 2016

Related U.S. Application Data

(60) Provisional application No. 62/150,829, filed on Apr. 21, 2015.

(51) Int. Cl.
*H04N 21/254* (2011.01)
*H04N 21/2543* (2011.01)
(Continued)

(52) U.S. Cl.
CPC ..... *H04N 21/2541* (2013.01); *H04L 12/1492* (2013.01); *H04L 29/08954* (2013.01); *H04L 65/1089* (2013.01); *H04L 65/4084* (2013.01); *H04L 65/604* (2013.01); *H04L 67/325* (2013.01); *H04N 7/162* (2013.01); *H04N 21/2385* (2013.01); *H04N 21/2543* (2013.01); *H04N 21/25841* (2013.01); *H04N 21/2665* (2013.01); *H04N 21/2668* (2013.01); *H04N 21/26216* (2013.01); *H04N 21/26225* (2013.01); *H04N 21/42623* (2013.01); *H04N 21/4408* (2013.01); *H04N 21/44016* (2013.01); *H04N 21/458* (2013.01); *H04N 21/4627* (2013.01); *H04N 21/6125* (2013.01); *H04N 21/812* (2013.01)

(58) Field of Classification Search
CPC ... H04N 21/812; H04N 21/2665; G06Q 30/02
See application file for complete search history.

(56) References Cited

U.S. PATENT DOCUMENTS

| | | | |
|---|---|---|---|
| 7,206,748 B1 * | 4/2007 | Gruse | G06F 21/10 380/277 |
| 2008/0101460 A1 * | 5/2008 | Rodriguez | H04N 21/2385 375/240.01 |
| 2016/0156945 A1 * | 6/2016 | Romrell | H04N 21/23424 725/36 |

* cited by examiner

*Primary Examiner* — Arvin Eskandarnia
(74) *Attorney, Agent, or Firm* — The Watson IP Group, PLC; Dan Fiul

(57) ABSTRACT

A customer premises equipment can include a receiver, a video demultiplexer, and an assembly engine. The receiver can receive a subscriber content price, for multimedia content, based on a scheduled lead-time of electronic delivery of the multimedia content via at least one transport provider servicing the customer premises equipment, and receive a scheduled delivery of the multimedia content within the scheduled lead-time in response to a subscriber request to deliver the multimedia content to the customer premises equipment. The video demultiplexer can demultiplex the received multimedia content and store selected demultiplexed multimedia content that is received by the customer premises equipment within the scheduled lead-time. The assembly engine can retrieve the stored multimedia content from a storage device and output retrieved multimedia content to a display device.

20 Claims, 15 Drawing Sheets

(51) Int. Cl.
*H04N 21/262* (2011.01)
*H04N 21/426* (2011.01)
*H04N 21/44* (2011.01)
*H04N 21/4408* (2011.01)
*H04N 21/458* (2011.01)
*H04N 21/4627* (2011.01)
*H04N 21/81* (2011.01)
*H04L 29/08* (2006.01)
*H04N 7/16* (2011.01)
*H04N 21/2385* (2011.01)
*H04N 21/258* (2011.01)
*H04N 21/2665* (2011.01)
*H04N 21/2668* (2011.01)
*H04N 21/61* (2011.01)
*H04L 29/06* (2006.01)
*H04L 12/14* (2006.01)

PRICE DRIVEN MULTIMEDIA CONTENT VIDEO TIME-BANDWIDTH PRODUCT IMPROVEMENT (VTBPI) RECEPTION

This application claims priority to U.S. Provisional Patent Application No. 62/150,829, entitled "Enhanced Video and Advertising Aggregation and Distribution", filed on Apr. 21, 2015, to Hirsch et al., the entirety of which is expressly incorporated herein by reference.

BACKGROUND

1. Field

The present disclosure is directed to a method and apparatus for scheduling electronic delivery of multimedia content and advertisements targeted to customer premises equipment. More particularly, the present disclosure is directed to scheduling, pricing, and delivering subscriber-selected, preplanned multimedia content and advertisements targeted to customer premises equipment.

2. Introduction

Traditional television viewing is linear. With linear television viewing, a viewer must watch scheduled television programs at a particular time and on a particular channel. However, the entertainment industry is in transition and content consumers are moving to personalized programming or nonlinear television. Personalized programming allows the content consumer to control content selection and viewing time. True personalized programming allows content customers to view whatever they want, whenever they want, as often as they want, and in an order that the content consumers desire. However, present technology offers content consumers a limited personalized programming experience with restricted selection and/or high prices. Such present technology includes Over-The-Top (OTT) streaming, Internet Protocol Television (IPTV), and Video on Demand (VOD) capability.

OTT streaming is delivered over the Internet, but is unmanaged. Content delivery is plagued by "last mile" congestion. This problem is encountered with non-Quality of Service (QoS) streaming. As streaming has increased, especially during periods of peak demand or prime time, congestion impact has become worse. Such congestion occurs with any over utilized, unmanaged, data rate limited, network system. IPTV are multimedia services, such as television or video, delivered over managed IP based networks which provide the required level of Quality of Service (QoS) and experience, security, interactivity and reliability. From the consumer's viewpoint, IPTV has limited selection and is expensive.

Demand for content distribution with respect to available transport varies as a function of time, consisting of peaks and valleys. Traditionally, supply and demand issues have been addressed by applying the principles of microeconomics based on supply and demand pricing theory. However, applying such microeconomics has not solved problems associated with content delivery.

Stand Definition (SD), High Definition (HD) and Ultra High Definition (UHD or 4K), or higher resolution formats present increasingly significant problems for existing network infrastructure and significantly higher price to content consumers. Such high resolution formats are limited because of data rate constraints and subscriber aggregate data limits. By 2018, the number of households using streaming has been projected to increase to 50% and beyond. Even with the current relatively low percentage of streaming, peak time network congestion is causing video disruption, such as video pixilation, synchronization problems, freeze frames, etc. This video disruption will be furthered exacerbated as more households move to content streaming, higher resolution video, and as additional real-time services are further employed.

Advertising can be used as a subsidized approach to both linear and personalized programming streaming. However with current advertising/content ratios, bandwidth required to additionally transmit advertising content is increased by as much as 50%. Other challenges that effect high impact advertising exist for both linear and personalized programming. Currently, advertisers have traditionally subsidized content production and distribution through advertisements (for example, commercials). This approach has a limited capability to target an audience segment. Advertisers are unable to target advertisements to individuals or cluster groups except by relying on associated program content. Currently, commercial selection and insertion is dependent on the targeted audience of the content rather than the targeted audience of the commercial. True, direct measures of advertisement effectiveness do not exist. Changing commercials on-the-fly to reflect changes in consumer content viewing habits is difficult. Also, it is extremely difficult to measure the impact of on-the-fly advertising on individual subscribers, cluster groups, and/or geographic areas based on selected advertising profiles.

SUMMARY OF THE DISCLOSURE

A customer premises equipment can include a receiver, a video demultiplexer, storage, and an assembly engine. The receiver can receive a subscriber content price, for multimedia content, based on a scheduled lead-time of electronic delivery of the multimedia content via at least one transport provider servicing the customer premises equipment, and receive scheduled delivery of the multimedia content within the scheduled lead-time in response to a subscriber request to deliver the multimedia content to the customer premises equipment. The video demultiplexer can demultiplex and store the selected demultiplexed multimedia content that is received by the customer premises equipment within the scheduled lead-time. The assembly engine can retrieve the stored multimedia content from a storage device and output retrieved multimedia content to a display device.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope.

DETAILED DESCRIPTION

Figure 1:
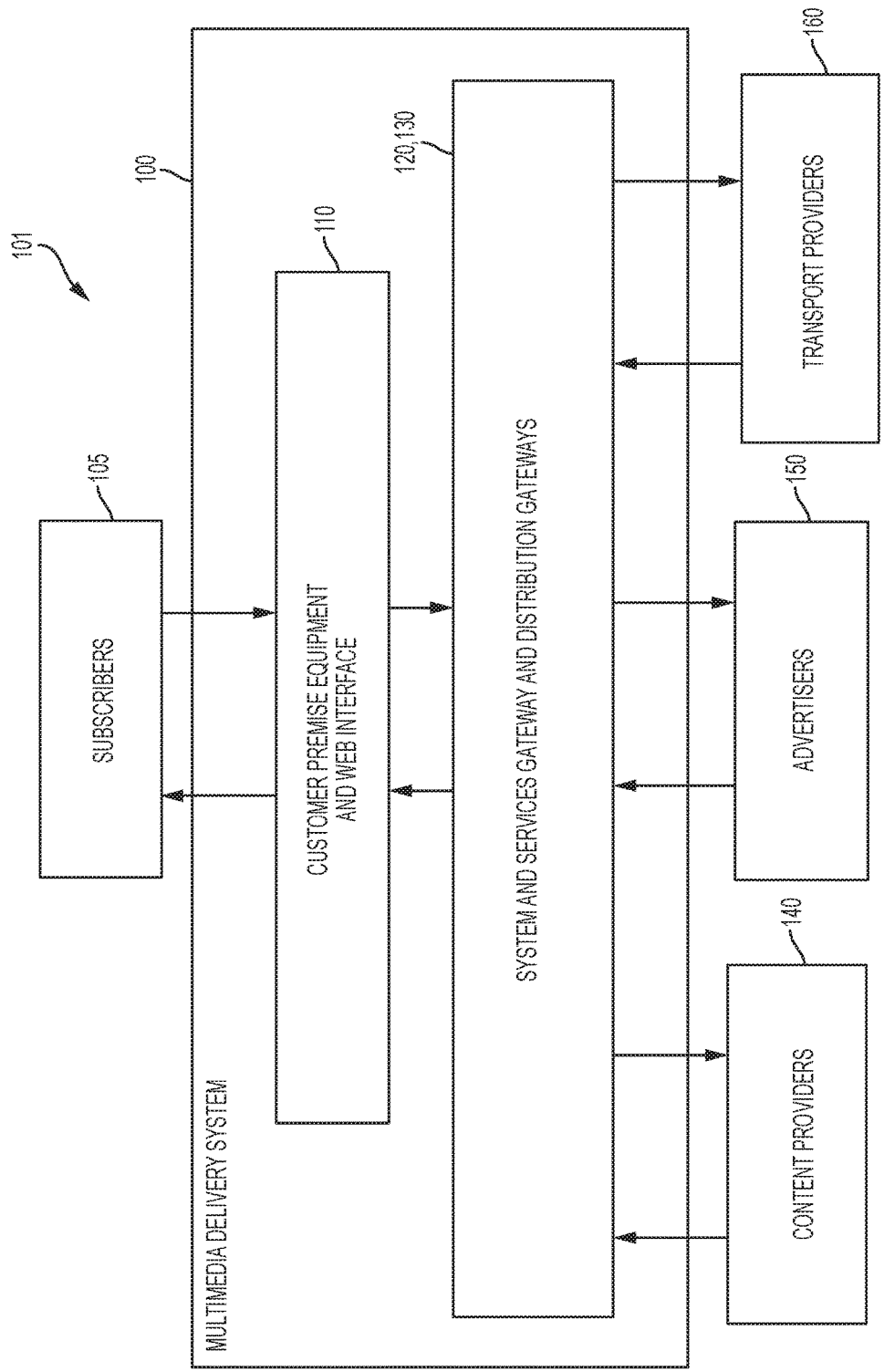
FIG. 1 illustrates an example multimedia system, in accordance with one or more possible embodiments.

A need exists for an efficient and effective use of transport resources to smooth out subscriber demand for multimedia content. A need also exists to subsidize the subscriber's multimedia content with on demand, changeable, subscriber-preferred targeted, non-targeted and/or requested advertisements without exacerbating bandwidth demands to deliver effective targeted and requested advertisements.

The embodiments described herein overcome the limitations discussed above, as well as expanding on capabilities of existing content distribution systems. The embodiments provide for apparatuses, systems, and methods that can establish one or more pricing models for advertising and subscriber selected video content driven by 1) subscriber preferences, 2) content provider pricing, 3) advertiser pricing and cluster selection, and 4) transport pricing (broadcast and network) based on cost driven by the use of predicted excess capacity as determined by one or more pricing models of transport systems. The terms price and cost are used interchangeably herein throughout.

The embodiments can optimize bandwidth/data rate constrained transport systems, with 1) multimedia content selection and viewing time, 2) accepted amount of advertising, and 3) price under a subscriber's control. The computer-based methods, systems, and apparatuses can be used to construct a real-time pricing model for the optimal use of transport resources.

The computer-based methods, systems and apparatuses disclosed herein can provide for personalized multimedia programming that includes the consumer's selected multimedia content, specified resolution, viewing time, lead-time, and an accepted number and type of embedded advertisements. Advertisers' preferences can be incorporated for targeting selected individuals, cluster groups of individuals, and geographic areas. Traditional advertising can be targeted at specific multimedia content. The embodiments disclosed herein provide for advertising that can be targeted to a cluster of the subscriber and/or to a specific subscriber or group of subscribers. The embodiments can analyze subscriber behavior and reward the subscriber for either existing or changing behavior that can result in lower operational costs.

The embodiments can limit a subscriber's specified maximum billing period cost (for example, a not-to-exceed price) based on the subscriber's desired multimedia content for viewing and can automatically adjust various subscriber parameters with respect to content providers', advertisers' and transporter(s)'s constraint(s).

The embodiments can further allow the subscriber to manually adjust their selected control preferences or parameters, including cost as an independent parameter, to the cost of viewing over a billing period through a web interface on a computer, the customer premises equipment (CPE), or other web accessible devices. The subscriber can also manually adjust their control parameters, including price, for individual content, content series, or selected subset of their desired personalized programming.

The computer-based methods, systems and apparatuses disclosed herein can also provide for the selection of cost-effective and resource-efficient methods of content distribution based on the use (in total or in part) of multiple broadcast and/or multiple network infrastructures, including, multicast, peer-to-peer and mesh architectures. A company implementing one or more of the embodiments disclosed herein can purchase, in bulk from an Internet Service Provider (ISP), blocks of data to supplement against the subscriber's data cap. This can be either in concert with the subscriber's existing data cap or executed as a completely separate transaction.

FIG. 1 illustrates an example multimedia system 101, in accordance with one or more possible embodiments. The multimedia system 101 can include a multimedia delivery system 100 to electronically delivery multimedia content to subscribers 105. The multimedia delivery system 100 can include customer premises equipment (CPE) 110, a system and services gateway 120, and one or more distribution gateways 130. The customer premises equipment (CPE) 110 can be coupled to the system and services gateway 120 and the distribution gateways 130. The system and services gateway 120 and distribution gateways 130 can be coupled to content providers 140, advertisers 150, and transport providers 160. Subscribers 105 can interact with the customer premises equipment 110.

The computer-based methods, systems and apparatuses disclosed herein can use all available subscriber 105, content provider 140, content delivery pricing from transport providers 160, and advertiser 150 cluster information to automatically price multimedia content. The computer-based methods, systems and apparatuses disclosed herein can select the most cost-effective use of available electronic delivery infrastructure to satisfy the multimedia content, preferences and pricing requests from subscribers 105.

The computer-based methods, systems and apparatuses disclosed herein can incorporate advanced analytics techniques that can place advertising into subscriber 105 clusters, or direct placement to a specific subscriber 105 or group of subscribers 105 with prioritization (for example, Direct Marketing Areas (DMA)). This prioritization can be based on the value the subscriber 105 places on an advertising and/or the value of a subscriber 105 to an advertiser 150. This includes the placement of the advertising in the multimedia content for maximum impact.

The computer-based methods, systems and apparatuses can allow for content transmission at a predetermined time and/or adaptively as a function of the predictive and/or measured loading on network distribution (including backbone and last mile of network service). The approach to multimedia content distribution disclosed herein can select a most cost efficient transport method and transport provider 160 for electronic content delivery or transport, delivery and transport being used interchangeably herein. Contracts with ISPs or the transport providers 160 for the purchase of data transfers during periods of reduced demand or periods of excess capacity can be utilized to minimize costs associated with multimedia content electronic delivery. A lower network Quality of Service (QoS) can be acceptable for electronic delivery of non-live content (i.e., scheduled content delivery), resulting in lower transport cost with improved subscriber 105 experience. The computer-based methods, systems and apparatuses disclosed herein can tolerate lower network QoS to the CPE 110, with multimedia content and advertising being pre-stored on the CPE 110 before it is assembled for display for a subscriber 105. The computer-based methods, systems and apparatuses disclosed herein can allow for error detection and correction to address data dropouts.

The computer-based methods, systems and apparatuses disclosed herein can price preplanned multimedia content of the subscriber 105 in bandwidth/data rate constrained digital distribution systems. Digital multimedia content files or packets can be transmitted over one or more of network and broadcast infrastructures, including multicast, torrent and/or mesh architectures, to the CPEs 110 of the subscribers 105. When multiple network and broadcast infrastructures are utilized, the digital packets are stored locally within a CPE 110 of the subscriber 105 for re-assembly into a viewable stream by a selected display device or devices at a specified time.

The subscriber 105 can interact with the multimedia electronic delivery system 100 through a web interface contained in the CPE 110. The subscriber 105 can communicate content selection and operational preferences to the multimedia delivery system 100. In response to these selection and operational preferences (see Table 4) the multimedia delivery system 100 can price the content and make this information available to the subscriber 105 via the web interface in near real-time.

TABLE 1

CPE Profile

Unique Identification Hash
CPE Identification Number
Account Holder Name
Street Address
City
State
Zip Code
Country
GPS Location
IP Address
ISP
Congressional District
State Political Districts TABLE 1-continued CPE Profile Local Political Districts
Trace Route to CPE (for maintenance and guided expansion)

TABLE 2

Subscriber Account Profile

CPE Unique Identification
Account Identification Number
Account Privacy Preferences
Maximum cost for the overall billing period
Control parameters of individual subscriber profiles (Parental)
Password/PIN/Thumbprint/Voice Recognition/Face Recognition/Other
Credit Card Number (for Billing only)
Expiration Date (for Billing only)
Validation Number (for Billing only)
Subscriber Data Cap(s)
Wired
Cellular
Satellite
Wi-Fi

TABLE 3

Individual Subscriber Profile(s)

Subscriber Account Unique Identification Link
Unique Identification Number
Personal Identification Number
Name
Preferences Table Link
Social Media Input and Connections
Main Subscriber (Parental) Control Limitation-Maturity Level of Content Allowed
Privacy Preferences (Individual Override-If over 18)
Subscriber Domain Shift-Changing viewing preferences and habits
Advertising Preferences (Non-targeted, Targeted, and Requested)
Maximum allowed spending controlled by the primary subscriber
Individual Subscriber Cost Limits-Profile 1
Content Class
Max Class Cost
Ad Preference
Lead-Time
Viewing Delay
Amount of Allowed Advertising
Video Quality/Resolution
Individual Subscriber Cost Limits-Profile 2
. . .
Individual Subscriber Cost Limits-Profile N

TABLE 4

Subscriber Preferences

History Reference Number
Time/Date Requested
Time/Date Viewed
Purchase Mode (Viewing window, Number of Times Allowed, Permanent)
Unique Identification Hash Link
Content Title #1
Content Season (if applicable)
Content Episode (if applicable)
Resolution (Mobile Device, SD, HD, UHD)
Length of Planning Interval (Content Viewing Delay)/Prior to broadcast
Requested Commercials Per Unit Content
IP Address
ISP
Content Identification (Library of Congress Number) *
Date of Content Identification Number *
IMDB Content Identification*
Social Media Connections TABLE 4-continued Subscriber Preferences Privacy Preferences
Advertising Preferences (Non-targeted, Targeted, and Requested)

* Appended in the System Gateway

TABLE 5

Subscriber History

Unique Subscriber Identification Hash
History Reference Number-0
Content Title ID
Time/date content was selected
Requested viewing system time/date
Actual content viewing system start time/date
Actual content viewing system stop time/date
Number of pauses
Average length of pauses
Fast Forward Operations
Rewind Operations
Method of transport
Time/date the content was started for delivery to CPE
Time/date the content delivery was completed
Amount and type of advertising accepted
List advertisements inserted-advertising position number and time/date displayed, directed
Advertising Skipped
Price of content when selected
Price of content when watched
Purchase mode
Resolution/quality
Display type
Content Price Equation Type Used for Pricing Content
Content Price Equation Descriptive Parameters (Coefficients, Slope, . . . )
Cluster Content Confidence Interval
Cluster Content Popularity Index
Time/date of Transfer to Mobile Device
History Reference Number-1
History Reference Number-2
. . .
History Reference Number-N
For each Content Item Requested or Recommended

TABLE 6

Multimedia Content Metadata

Unique Database Identification
Content Title
Title ID (Database Specific or Library of Congress Number)
Content Rating as a Function of Time from Release Date
Technical Specs (Running Time, Sound Mix, Color, Aspect Ratio, etc.)
Content Genre (Action, Crime, etc.)
Release Date
Content Director
Content Writer(s)
Content Star(s)
Related Content
Storyline
Plot Keywords
Tag Line(s)
Country of Origin
Filming Locations
Production Company(ies)/Network
Company Contact Data
User Review
MPAA Rating
Curated Reviews
Profession Reviews
Content Season and Episode
Special Effects
Content Provider Price Advertisers 150 can pay for the attention of the subscribers 105. Advertisers 150 can provide commercials, desired viewer cluster, and campaign objectives through the dedicated interfaces of the multimedia delivery system 100. The multimedia delivery system 100 can use such information together with sophisticated mathematical algorithms (for example, executed by a system processor 128 shown in FIG. 3) to match requested clusters to the subscribers 105, preferably not to multimedia content. This matching technique can provide advertisers 150 a more cost effective technique to reach their desired audience.

The transport providers 160 can provide the parameters shown in Table 7 to the system and services gateway 120, through dedicated interfaces. These parameters can be used to schedule and price excess capacity of a transport provider 160 to lower distribution price to customer premises equipment 110 of subscribers 105, as well as to make maximal use of a delivery network, particularly during a period when a delivery network is being underutilized, for example midnight to 6 A.M.

TABLE 7

Advertiser Request and Parameters

Unique Advertiser Identification
Unique Commercial Identifier
Advertising Category
Demographic Preferences
Geographic Preferences
Technical Content of Advertiser
Advertising Priority
Associated Advertising
Number of Times Advertising to be Shown
Minimum Time Interval to Repeat
Preferred Advertising Position
Preferred Show or Content Type
Zip Code Assignment
Political Boundaries
Advertising QoS (AQoS)
Advertising Value of Advertiser to Subscriber
Advertising Value of Subscriber to Advertiser
Direct Advertising Insertion
Advertising Demographic Group ID
Redeemed Advertising Credit Coupon No.1
Redeemed Advertising Credit Coupon No.2
. . .
Redeemed Advertising Credit Coupon No. N
Advertising Impact QoS (AIQoS)

The content providers 140 can provide information that allows the multimedia delivery system 100 to delivery multimedia content to the subscribers 105. For example, the content providers 140 can provide content listing, licensing and pricing information, together with multimedia content to the multimedia delivery system 100 though dedicated interfaces.

Figure 2:
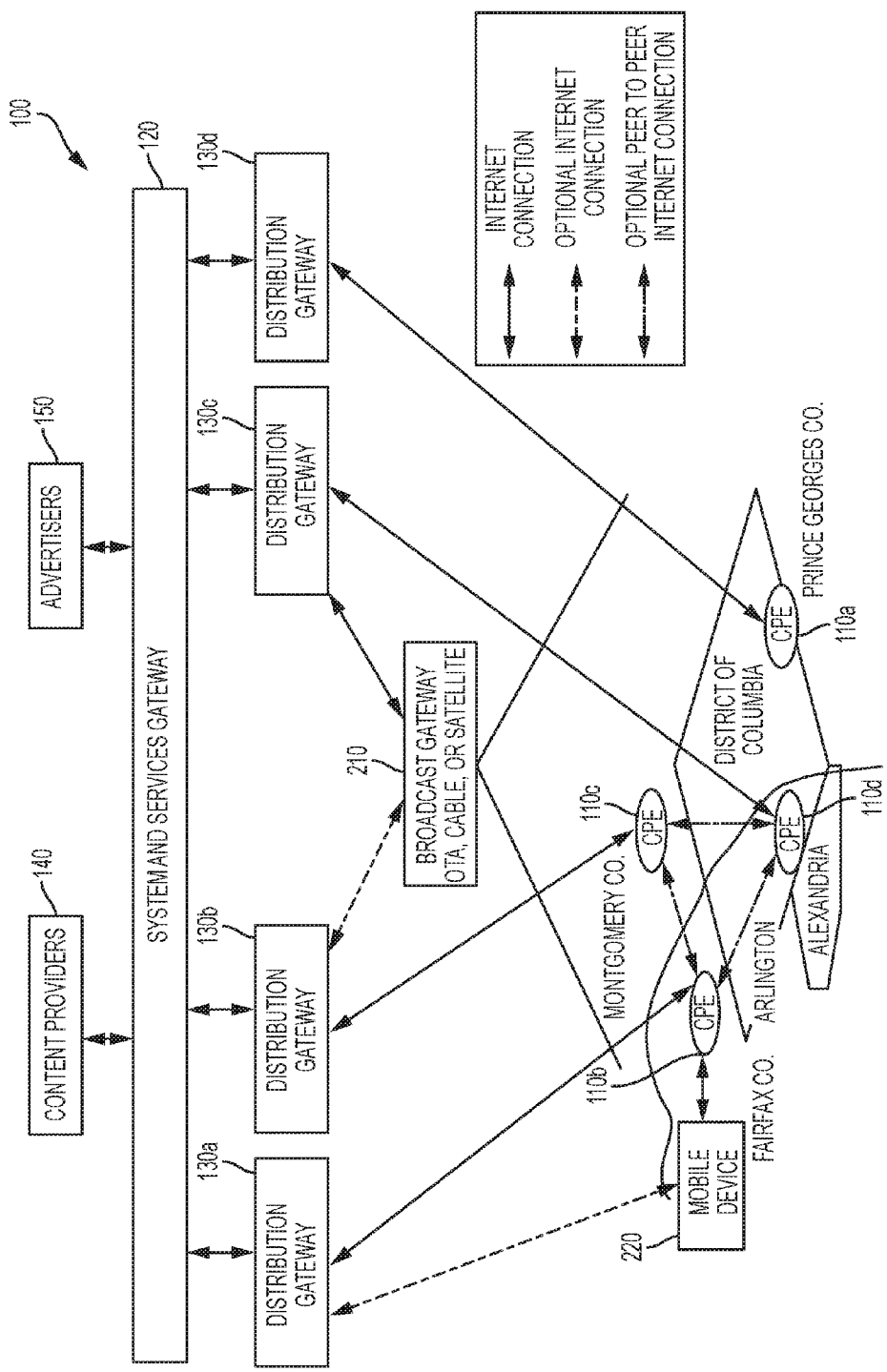
FIG. 2 illustrates example interoperability of components of a multimedia delivery system, according to one or more possible embodiments.

FIG. 2 illustrates example interoperability of components of the multimedia delivery system 100, according to one or more possible embodiments. The system and services gateway 120 can be coupled to content providers 140 and advertisers 150. The system and services gateway 120 can be further coupled to a plurality of distribution gateways 130a-d. One or more of the distribution gateways 130a-d can be coupled to a broadcast gateway 210. The broadcast gateway 210 can deliver multimedia content over broadcast infrastructure, such as over-the-air broadcast infrastructure, cable broadcast infrastructure, satellite broadcast infrastructure, and/or any other broadcast infrastructure. The distribution gateways 130a-d can allow for simultaneous, synchronous and asynchronous (not in time order) delivery of multimedia content to CPEs 110 of subscribers 105 over one or more of network and broadcast distribution infrastructures. The broadcast gateway 210 can determine what multimedia content is transmitted over each transmission infrastructure based on resource excess capacity, resource cost, and resource availability. The CPEs 110 can store such data from multiple sources and reconstructed the multimedia content in proper order for viewing with the CPE 110 of the subscriber 105. The CPE 110 can be at least partially implemented with a carrier supplied customer premise equipment, a digital video recorder, a set top box, a video extender, a smart television, a personal computer, a tablet computer, a smart phone, with a software application ("app") implementation, and/or any other media device that can play the multimedia content.

Distribution gateway 130a can be coupled to CPE 110b via an Internet connection and optionally coupled to mobile device 220 via an Internet connection. Distribution gateway 130a can service a specific geographic region, for example CPE 110 devices within Fairfax County. Distribution gateway 130b can be coupled to CPE 110c via an Internet connection and optionally coupled to the broadcast gateway 210 via an Internet connection. Distribution gateway 130a can service a specific geographic region, for example CPE 110 devices within Montgomery County. Distribution gateway 130c can be coupled to the broadcast gateway 210 via an Internet connection and to CPE 110d via an Internet connection. Distribution gateway 130c can service a specific geographic region, for example CPE 110 devices within a region of the District of Columbia. Distribution gateway 130d can be coupled to CPE 110e via an Internet connection. Distribution gateway 130d can service a specific geographic region, for example CPE 110 devices within a different region of the District of Columbia that those CPE 110 devices serviced by distribution gateway 130c. CPE 110b can be optionally coupled to CPE 110c and CPE 110d via a peer-to-peer Internet connection. CPE 110c and CPE 110d can be optionally coupled via a peer-to-peer Internet connection. The size of a specific geographic region that a particular distribution gateway 130 services can be a function of the location and density of CPEs 110 of subscribers 105 within a geographic region.

The system and services gateway 120 and the distribution gateways 130 can be implemented redundantly, and can work through individual failures, either in hardware of the multimedia delivery system 100 or Internet connectivity. A backup hot spare of the system and services gateway 120 can be maintained such that in the event of a failure, operations transition seamlessly to the backup hot spare.

The multimedia delivery system 100 can operate with many distribution gateways 130. In an event of a distribution gateway 130 failure, the operation of the failed distribution gateway 130 can be spread to several nearby distribution gateways 130 until the failure is corrected.

In one or more possible embodiments, there can be no redundant backup for an individual CPE 110, per se. However, a subscriber 105 can stream multimedia content using an alternate media CPE 110 device, for example, a digital video recorder, a set top box, a video extender, a smart television, a personal computer, a tablet computer, a smart phone, a software application (app) implementation, and/or any other media device that can play the multimedia content, in the event of a primary CPE 110 failure. Such streaming to an alternate media CPE 110 device can be performed at no additional cost to the subscriber 105.

The system and services gateway 120 can price subscriber's preplanned multimedia content in bandwidth/data rate constrained digital distribution systems. Digital multimedia content files or packets can be transmitted utilizing at least one of network and broadcast infrastructures, including multicast, torrent and mesh architectures, to the CPEs 110 of the subscribers 105. When multiple network and broadcast infrastructures are utilized, the digital packets are stored locally within the CPEs 110 for re-assembly into a viewable steam, preferably prior to release for viewing by a selected display device or devices at a specified time(s).

The system and services gateway 120 can transmit to the CPEs 110 a list of subscriber selected and recommended multimedia content, multimedia content that meets/does not meet subscriber cost constraints, and/or multimedia content that has/has not been downloaded to the CPE 110. The system processor 128 can perform multimedia content recommendation based on information from Tables 1 through 6 to discover the recommended multimedia content. The system processor 128 can determine confidence intervals for each of the subscriber 105 selected and recommended multimedia content, the confidence intervals indicating a likelihood that the multimedia content from the recommended multimedia content best matches preferred subscriber 105 multimedia content. A list of subscriber 105 selected and recommended multimedia content and the confidence intervals, respectively, can be transmitted to the CPE(s) 110 for display to the subscriber(s) 105 via a user interface of the CPE(s) 110.

Figure 3:
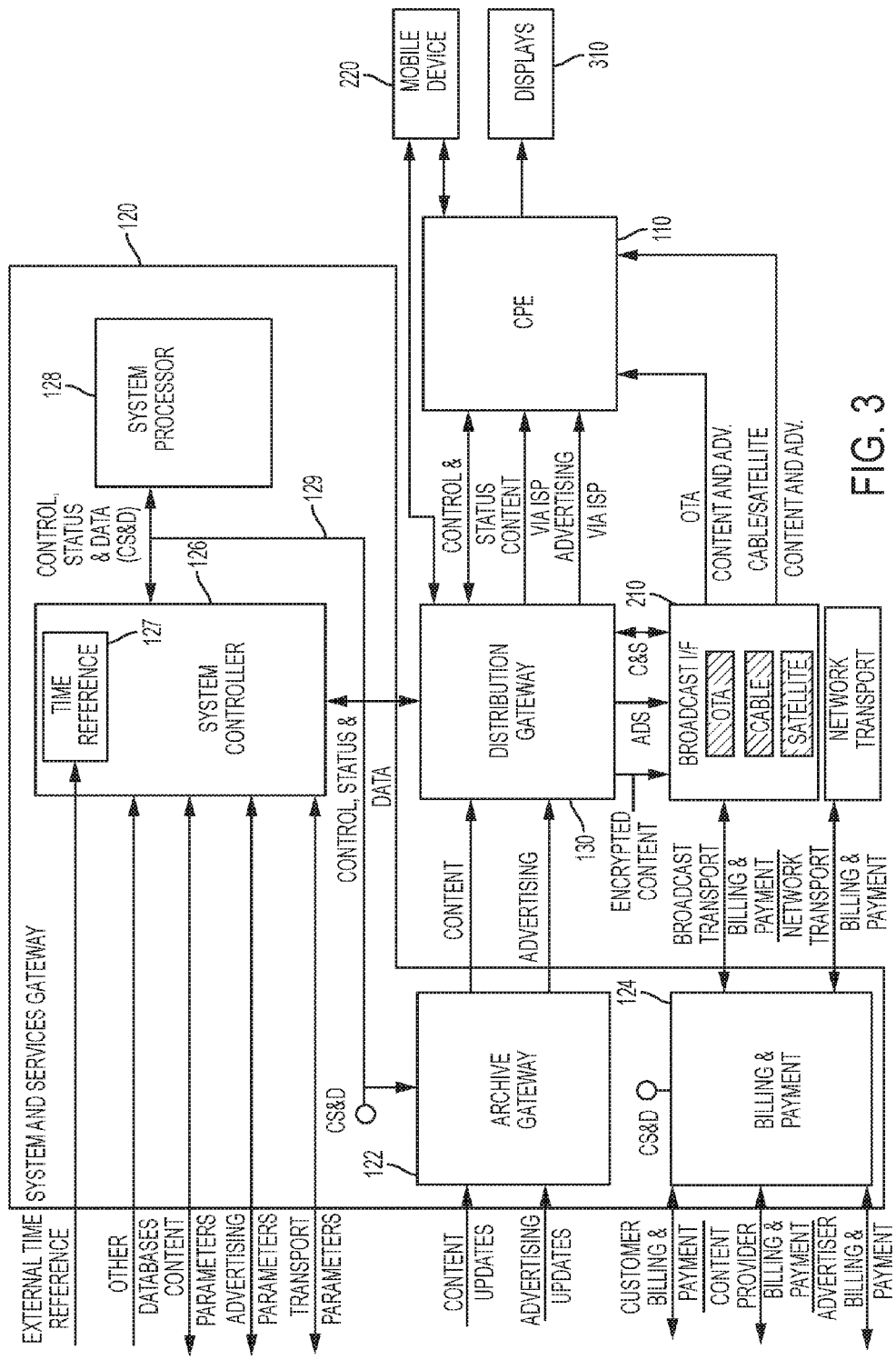
FIG. 3 illustrates an overall block diagram of the example multimedia delivery system, in accordance with one or more possible embodiments.

FIG. 3 illustrates an overall block diagram of the example multimedia delivery system 100, in accordance with one or more possible embodiments. The system and services gateway 120 can include an archive gateway 122, a billing & payment module 124, a system controller 126, and a system processor 128. The system controller 126 can include a time reference module 127. The archive gateway 122 can be coupled to the system controller 126 and the system processor 128 via a control, status & data bus 129. The distribution gateway 130 can be coupled to the broadcast infrastructure 210 for transmission of multimedia content and advertising. The broadcast infrastructure 210 can include such broadcasting infrastructure as over-the air broadcast infrastructure, cable broadcast infrastructure, satellite broadcast infrastructure, cellular, and/or any other broadcast network that allows multimedia content to be transmitted to the CPEs 110 of the subscribers 105. At least a portion of the system and services gateway 120 (for example, the system processor 128) can be partitioned and operated simultaneously in, one or more of the following environments: local computing, mobile computing, and distributed computing and cloud-computing.

The archive gateway 122 can receive such information as multimedia content updates and advertising updates. The archive gateway 122 can transmit multimedia content and advertising to the distribution gateway 130. The multimedia delivery system 100 can store the multimedia content in the archive gateway 122 (or archive cloud) for transfer to the distribution gateway 130 for commonly viewed multimedia content and to CPEs 110 of the subscribers 105 under agreed licensing and pricing terms and conditions.

All data from external interfaces can be handled through the multimedia delivery system 100. In particular, such data from external interfaces can be sent and received by the system controller 126. This data can include subscriber 105 parameters provided by the subscribers 105, content provider 140 parameters provided by the content providers 140, advertiser parameters provided by the advertisers 150, and transport parameters provided by the transport providers 160, an external time reference 127, and other databases to be used to optimize the multimedia delivery system 100. The external time reference can be distributed throughout the multimedia delivery system 100. The external time reference can be used to maintain synchronization for deconstructing and constructing multimedia content and advertising, as well as token authorization and decryption. The system controller 126 can receive an external time reference 127 and information from other databases.

The distribution gateway 130 can send and receive information from the mobile device 220 operating as a CPE 110. The distribution gateway 130 can send and receive, to and from the CPE 110, such bidirectional information as control & status that can be either encrypted or unencrypted, and transmit such information as multimedia content via a transport provider 160 and advertising via a transport provider 160. The distribution gateway 130 can transmit to the broadcast infrastructure 210 such information as encrypted multimedia content and advertisements, and send and receive, to and from the broadcast infrastructure 210, such bidirectional information as control and status that can be either encrypted or unencrypted. The distribution gateway 130 can send multimedia content and advertising to the mobile device 220. In one or more possible embodiments, the CPE 110 can send multimedia content to the mobile device 220 to be viewed on one or more displays 310, either for storage or live streaming from the CPE 110.

The broadcast infrastructure 210 can transmit multimedia content and advertising over one or more of the over-the-air broadcast infrastructure, cable broadcast infrastructure, and satellite broadcast infrastructure. One or more possible embodiments can maintain a multi-stage process for Internet delivery of multimedia content and advertising to a subscriber 105. All multimedia content and advertising, from their respective sources, can be initially transferred to a central repository, the archive gateway 122. The archive gateway 122 can provide for long term storage or the "permanent" storage of multimedia content. The functions performed by the archive gateway 122 can be distributed in the distribution gateways 130 and/or be performed in a cloud-computing environment.

Frequently selected multimedia content can be transferred from the archive gateway 122 to distribution gateways 130 for staging. The distribution gateways 130 can be located throughout the country to minimize the impact to the Internet and therefore transport price(s). The multimedia content maintained on the distribution gateway 130 can be regularly updated to reflect new popular multimedia content becoming available, with pruning being performed on least frequently selected multimedia content that is on the distribution gateway 130. The multimedia content selection maintained on a given distribution gateway 130 can be individually optimized and can be different from region to region. The multimedia content selection maintained on distribution gateways 130 can also be updated periodically and can reflect seasonal viewing preferences, for example, holiday multimedia content during holidays, horror multimedia content during Halloween, etc.

Infrequently selected multimedia content can be maintained only on the archive gateway 122. The infrequently selected content, upon a request from the subscriber 105, can be transferred to the distribution gateway 130 and placed in temporary storage of the distribution gateway 130. This buffered multimedia content can then be processed as frequently viewed multimedia content for delivery to a requesting CPE 110 of the subscriber 105, again minimizing the impact to delivery infrastructure (for example, the Internet) and price. The amount of storage maintained in the distribution gateway 130 can be optimized to minimize the overall capital expenditure and operational costs, trading off the cost for adding and maintaining disk storage vs. the Internet backbone impact and cost of delivering infrequently selected content that can be maintained on the archive gateway 122. The optimized storage maintained on the distribution gateways 130 can be different from region to region.

Staged content on the distribution gateway 130 can be transferred to the CPE 110 of the subscriber 105 upon a request from the subscriber 105. Since one or more of the embodiments encourage, via economic incentives, to have subscribers 105 preplan their content selection, the delivery of multimedia content to the CPE 110 can be performed to minimize delivery infrastructure (for example, the Internet) transport charge(s).

The system processor 128 can analyze the multimedia content stored on each archive gateway 122 and each distribution gateway 130. This analysis can use the information contained in subscriber 105 preferences shown in Table 4 and subscriber 105 viewing history data shown in Table 5. Using this analysis, the system processor 128 can rank multimedia content by popularity, longevity, and cost to maintain the multimedia content in the repository of the archive gateway 122 to determine what multimedia content is stored and when it's purged from the repository of the archive gateway 122. Purged multimedia content can be stored in offline storage. This process can be adjusted for seasonal and regional viewing preferences. This information and instructions are passed to the system controller 126 for distribution to the archive gateway 122 and subsequently to the distribution gateway 130.

The system processor 128 can use information contained in CPE profile data shown in Table 1, subscriber 105 account profile shown in Table 2, individual subscriber 105 profile shown in Table 3, subscriber 105 preferences data show in Table 4, subscriber 105 history data shown in Table 5, and multimedia content metadata from external databases shown in Table 6 to discover multimedia content to recommend to the subscribers 105. Such information can be used to create a community of subscribers 105 with common viewing interests and build a subscriber 105 social network. This community can provide discussion groups (similar to a book club), forums, subscriber-written reviews, and lists of curated content for and by subscribers 105. These communities build subscriber 105 affinity and cohesiveness, which can create subscriber 105 "stickiness". This stickiness translates into attention and can create added value for the advertisers 150. Advertisers 150 can use this increased attention to add value to their commercials. Existing social networks (e.g., Facebook) can be integrated into the multimedia delivery system 100.

The price for multimedia content may be determined by the system processor 128 as an exponential decay as a function of time as follows:

$$\text{Content Provider Price}_{i,j}(t) = (\text{Start Price}_{i,j} - \text{Tail Price}_{i,j}) * \exp[-\beta_i * (t - \text{Start Time}_i)] + \text{Tail Price}_{i,j}$$

where t is a function of any instantaneous time, i identifies the specific content, j identifies content resolution, and $\beta_i$ identifies the decay rate of the specific multimedia content. More complex models can be instantiated within the system processor 128.

The multimedia content price to the subscriber 105 can be determined by the system processor 128 according to the equation as follows:

Subscriber Content Price=Content Provider Price+
Content Delivery Price−Advertising Subsidy+
Commissions on all Pricing transactions Thus, the subscriber multimedia content price can be expressed a function of at least one of the content provider 140 price, the content delivery price, the advertising subsidy, and the commissions. The commissions can be associated with at least one of selecting the multimedia content, scheduling delivery of the multimedia content, pricing of delivery of the multimedia content, and inserting an advertisement into the multimedia content. The system processor 128 can calculate each of the terms on the right side of this equation. The system processor 128 can compute these quantities simultaneously and in parallel using various mathematical methods and techniques. The system processor 128 can process all cost/price/demand models simultaneously. An adjudication process can be executed by the system processor 128 that can select the best content provider 140 price, which can increase content demand and maximize the content provider's 140 revenue/profit. Initially, parameters for the adjudication process may be set by the content provider(s) 140 and refined by actual CPE 110 measurements and test marketing, or focus group data, within the system processor 128. The system processor 128 can use the collected data to predict the Start Price (shown in FIG. 8 as Start Price 875 on a content provider 140 price curve 810) of multimedia content being a price of multimedia content at a time at which the multimedia content is made available for viewing, the Tail Price (shown in FIG. 8 as Tail Price 880 on content provider 140 price curve 810) of multimedia content being a multimedia content price which decreases as the view-delay becomes large, and $\beta_i$ being an exponential decay parameter that can be for specific multimedia content or clusters of multimedia content. Then, the predicted parameters can be used to calculate the content provider 140 price for each particular multimedia content. The goal is to maximize the content providers' 140 revenue by increasing multimedia content demand by decreasing the multimedia content's price, which in turn can stimulate demand by the subscribers 105. The content provider's 140 cost/price and investment payoff schedule can be considered in these calculations. The system processor 128 can simultaneously perform this costing/pricing function with advertiser 150, transport provider 160, and subscriber 105 pricing data considered.

The system processor 128 can calculate the Advertising Quality of Service (AQoS) and prioritize advertising to achieve a specified AQoS. The AQoS can include a minimum percentage of distinct subscribers 105 that have a specified advertisement displayed a minimum number of times for the multimedia system 101 or advertiser 150 specified cluster. This process can use the information contained Tables 1, 2 and 3, subscriber 105 viewing histories, external databases (for example, advertiser supplied databases) and advertiser 150 demographics of interest. Advertisers 150 can also purchase exclusivity or limited exclusivity during the viewing of a specified multimedia content by their selected or multimedia system 101 selected cluster profiles. In at least one embodiment, the subscriber 105 can be given a credit coupon by a product seller when associated advertising is viewed and the product is purchased to reduce the out-of-pocket expenses of the subscriber 105 to maintain services and multimedia content provided by the multimedia system 101. The feedback of advertising to a purchase, AQoS, type of advertising (targeted, non-targeted, and subscriber requested), and subscriber 105 interaction with the CPE 110 can be used by the system processor 128 to measure an Advertising Impact Quality of Service (AIQoS). This can be performed for both national and regional advertisers 150.

Placement of an advertisement within content is based on maximum value to an advertiser 150. The system processor 128 can determine such value and priority using subscriber 105 profiles, subscriber 105 viewing history, subscriber 105 account profile, individual subscriber 105 profiles, subscriber 105 preferences, advertiser requests and parameters, interactions of the subscriber 105 with the CPE 110, and/or one or more of factors show in tables 1-6. The system processor 128 can transmit results of such a determination to the CPE 110 for assembly of an advertisement within multimedia content. These factors can include: cluster-specific and individual-specific subscriber 105 profiles, type of advertisement (generic cluster-specific, advertiser-specific, and subscriber-requested), time and date of a start request, value and cycle (i.e., selection of a next advertisement in a value-ordered list of advertisements can be sent to a CPE 110 of a subscriber 105 to be inserted in the multimedia content.

The system controller 126 can transmit this list to the CPE 110. The CPE 110 can maintain and update this ordered list through a prioritized list of advertisements assignments for each available commercial slot, tracking of a number of times a particular advertisement is viewed within a given time interval, a last time a particular advertisement was shown to a subscriber 105 of the CPE 110 to determine when such an advertisement should be shown again to cluster-specific and individual-specific subscribers 105, subscriber 105 demographic profile (used by advertisement insertion instruction module of the CPE 110 (not shown)), type of advertising accepted or requested by a subscriber 105 via the CPE 110, a predetermined value of a cluster-specific and individual-specific subscriber 105 to an advertiser 150 in its processing, decreasing value of an advertisement with the passage of time or repeated viewings within a specified time interval to a cluster-specific or individual-specific subscriber 105, and repeated viewings of multimedia content can have different advertisements inserted for each viewing of the multimedia content by cluster-specific and individual-specific subscribers 105. These factors can further include an advertisement or advertising campaign as specified by an advertiser 150 to be inserted within multimedia content based on one or more of cluster-exclusivity, limited cluster-exclusivity, content-specific insertion for selected cluster subscriber 105-profiles, individual-subscriber 105 profiles, advertiser 150 specified minimum number of times an advertisement is displayed, a minimum number of repetitions within a time interval an advertisement can be shown to a subscriber-cluster or individual subscriber 105, advertiser 150 specified demographic-seeding instructions to perform more focused clustering for products and services, advertiser 150 specified regional and national insertion and display of an advertisement, advertiser 150 specified advertisement play time of when the advertisement is presented to a subscriber 105 within the multimedia content relative to the start of the multimedia content, content position (cluster-specific and individual-specific) of advertising insertion times, an advertisement actual play time within a specific multimedia content, position of the advertisement, and content checked (against the specified advertisement play time, content and position) for AQoS and AIQoS validation.

The system and services gateway 120 can limit a subscriber 105 specified maximum price for a billing period (for example, bi-weekly, monthly, quarterly, semi-annually, yearly, and/or any other billing period selected by a subscriber 105) based on the subscriber's 105 desired multimedia content for viewing. The system and services gateway 120 can automatically adjust various subscriber parameters with respect to constraints of the content providers 140, advertisers 150, and transport provider(s) 160. The system and services gateway 120 can automatically adjust preferences of the subscriber 105 to meet a subscriber 105 set price limit for a billing period based on selected multimedia content. The system processor 128 of the system and services gateway 120 can perform dynamic pricing that includes automatic design-to-price of personalized multimedia content programming of the subscribers 105 based on a willingness of the subscribers 105 to modify viewing choices and preferences. For example, the CPE 110 can allow a subscriber 105 to select and control modification of a preference including at least one of an allowed amount of advertising to be inserted in the multimedia content, the lead-time of electronic delivery, a multimedia content delayed viewing period, a multimedia content resolution, and targeted, non-targeted, and subscriber requested advertising types to meet the maximum price for the billing period. Such selection and modification can be based on the subscriber 105, via the CPE 110, selecting at least one of multimedia content for viewing, selecting a different time/ date for viewing of the multimedia content, and modifying at least one of the subscriber selected preferences different from the at least one of the subscriber selected preferences modified to meet the maximum price for the billing period.

Figure 4:
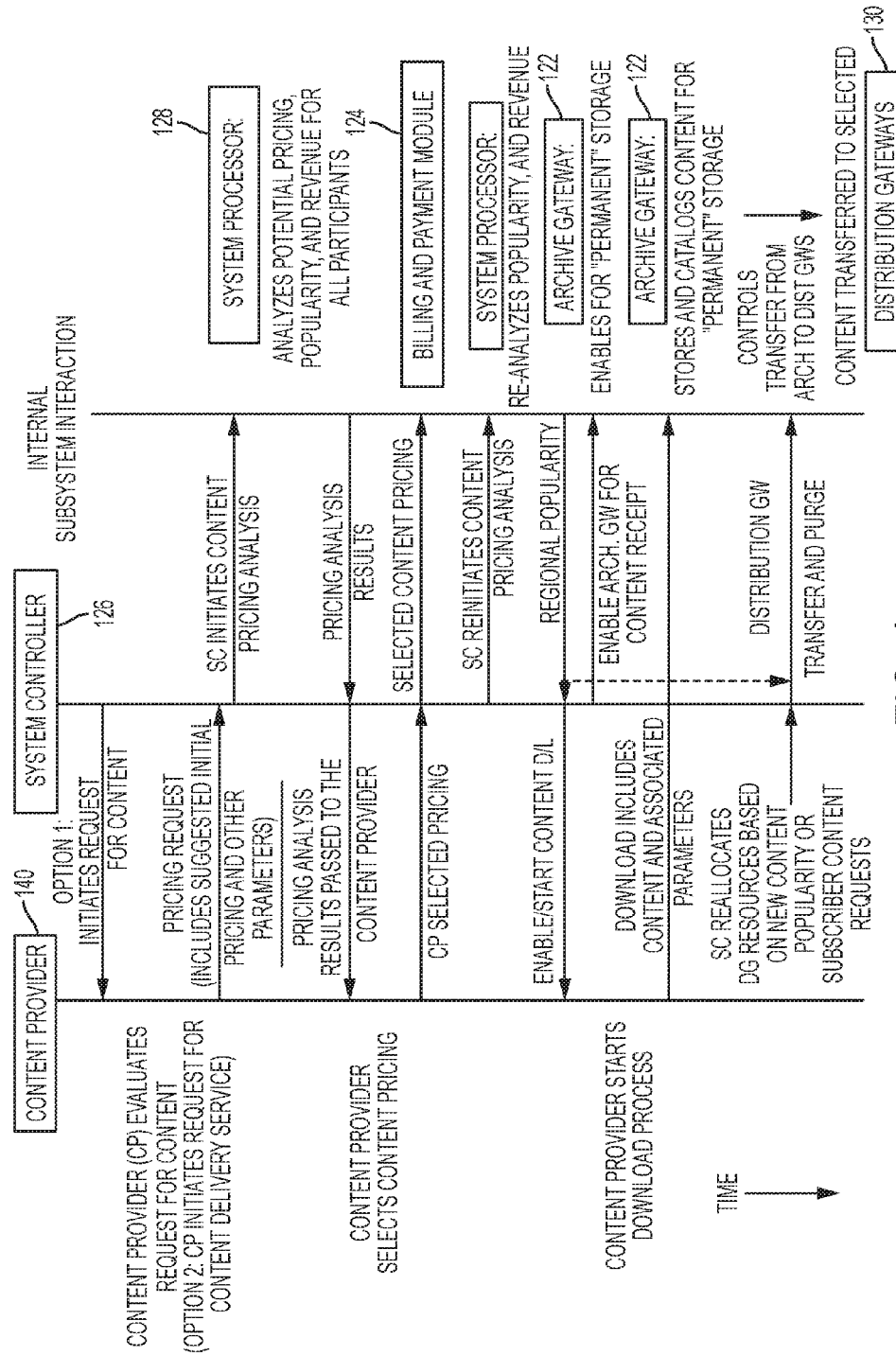
FIG. 4 illustrates an example interaction between a content provider and an SSG-system controller, and interaction between the system controller and internal subsystems of the multimedia delivery system, in accordance with one or more possible embodiments.

FIG. 4 illustrates an example interaction between the content provider 140 and the system controller 126, and interaction between the system controller 126 and internal subsystems of the multimedia delivery system 100, in accordance with one or more possible embodiments. Either the system controller 126 (Option 1) or a content provider 140 (Option 2) can initiate a request for content delivery to the multimedia delivery system 100. The content provider 140 can respond to Option 1 or Option 2 with a pricing request. This pricing request can include an identification number of the content provider 140, a unique multimedia content identification number, a suggested multimedia content price, and other parameters (for example, content screenplay, available content resolution(s), content file size(s), content runtime(s), and other multimedia content descriptive information). This information can be sent to the system controller 126 through a Virtual Private Network (VPN). The system controller 126 then can send this information to the system processor 128.

The system processor 128 can analyze data of the multimedia content, including advanced analytics to analyze the screenplay for plot, and other production choices, for example actors, directors. This analysis can be used in conjunction with subscriber 105 cluster interests. The system processor 128 can provide, based on this analysis, potential content pricing, popularity, and expected content provider 140 revenue. This processing can take into account a domain shift associated with changing subscriber 105 viewing preferences and habits. The system processor 128 can then pass this information back to the system controller 126 which passes the information back to the content provider 140. The information returned to the content provider 140 from the system processor 128, via the system controller 126, can include: 1) the potential subscriber 105 demand for the multimedia content at as a function of price, 2) the predicted popularity of the multimedia content (for example, from clustering analysis performed in the system processor 128) and 3) expected revenue generated by the multimedia content as a function of time. The system processor 128 can analyze and optimize the multimedia content pricing and recommendation, advertising pricing and transport pricing functions either independently or all functions simultaneously/globally through the use of local and global adjudication.

The system controller 126 can calculate an optimum price together with a table that provides the expected demand, expected popularity and expected revenue as a function of a multimedia content price curve. This information can then be passed to a content provider 140 as a basis to select a multimedia content price. The content provider 140 can choose to select the optimum price for the multimedia content determined by the system and services gateway 120 or set a different price. The final selected price is sent by content provider 140 back to the system controller 126. If the content provider 140 selects a multimedia content price that differs from the optimum price determined by the system and services gateway 120, the system controller 126 can forward the new information to the system processor 128 for revaluation. The system processor 128 can reevaluate the popularity and revenue model for internal use by the multimedia delivery system 100. However, even if the content provider 140 selects a suboptimum price, the multimedia delivery system 100 will use that price. The system controller 126 can forward this multimedia content pricing to the billing and payment module 124. The interaction and operation between the system controller 126, the system processor 128, external interfaces (with content providers 140, advertisers 150, and content broadcast and network transport), the archive gateways 122, and the distribution gateways 130 can be controlled by the system controller 126.

The reevaluation of multimedia content popularity as a function of time can be necessary to maintain the archive gateways 122 and the distribution gateways 130. The maintenance can purge less popular multimedia content, thereby freeing up storage for more popular multimedia content. Whenever new multimedia content is added to the archive gateways 122 or distribution gateways 130, the system controller 126 can task the system processor 128 to perform a multimedia content popularity analysis to make storage available. As shown in FIG. 4, the system controller 126 can perform this purging process before enabling multimedia content (or advertising) transfer from a content provider 140 (or an Advertiser 150) to the archive gateways 122. Also, the system controller 126 can perform this purging process before enabling multimedia content (or advertising) transfer from an archive gateway 122 to one or more regional distribution gateways 130.

The distribution gateway 130 can be coupled (for example, contain) to one or more of solid state and/or disk-based storage. Periodically, the system controller 126 can task the system processor 128 to analyze subscriber 105 multimedia content requests. Based on the received analysis, the system controller 126 can reallocate existing distribution gateway 130 multimedia content between solid state and disk-based storage to achieve lower operating cost and faster multimedia content retrieval.

Figure 5:
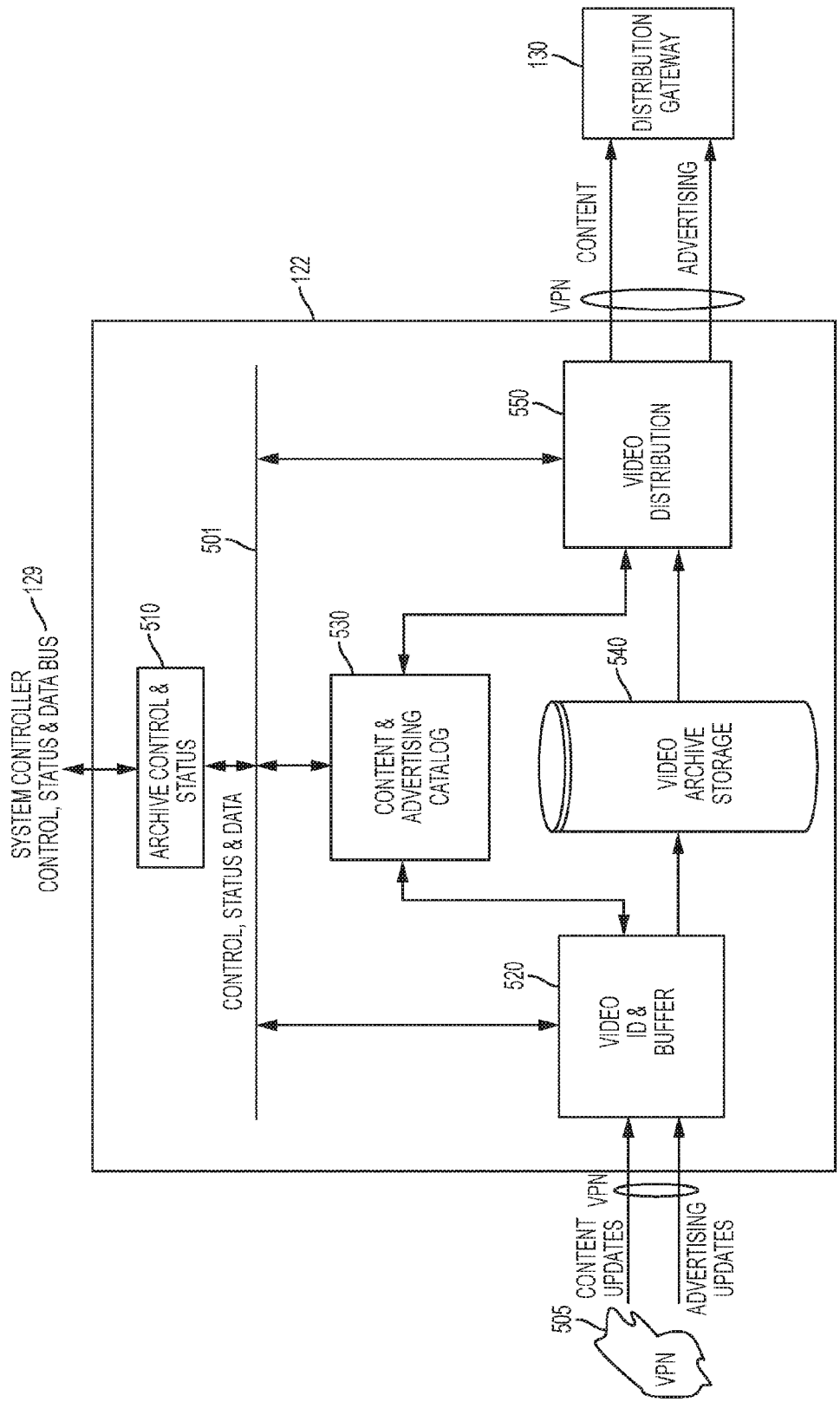
FIG. 5 illustrates a block diagram of an example archive gateway, in accordance with one or more possible embodiments.

FIG. 5 illustrates a block diagram of an example archive gateway 122, in accordance with one or more possible embodiments. The archive gateway 122 can include an archive control & status module 510, a video ID & buffer module 520, a content & advertising catalog 530, video archive storage 540, and a video distribution module 550. The archive control & status module 510 can be coupled to the control, status & data bus 129 and a control, status & data bus 501 within the archive gateway 122. The video ID & buffer module 520 can be coupled to a Virtual Private Network (VPN) 505, the control, status & data bus 501, the content & advertising catalog 530, and the video archive storage 540. The content & advertising catalog 530 can be coupled to the control, status & data bus 501 and the video distribution module 550. The video archive storage 540 can further be coupled to the video distribution module 550. The video distribution module 550 can further be coupled to the control, status & data bus 501 and the distribution gateway 130.

The archive gateway 122 can store all active multimedia content and advertising that may be accessed in the multimedia delivery system 100. This includes licensed multimedia content and active advertising. All new multimedia content and advertising can be received via the VPN 505 from their respective sources, the content providers 140 and the advertisers 150. The video data can be buffered for conversion into a format used by the multimedia delivery system 100 and cataloged. Once this process is complete, the multimedia delivery system 100 formatted multimedia content can be transferred to the video archive storage 540. The content & advertising catalog 530 can maintain an index for all multimedia content and advertising stored in the video archive storage 540.

The video distribution module 550 can control transfer of multimedia content and advertising to the distribution gateway 130. Commonly requested multimedia content (new and perennial favorites) can be stored and serviced directly from the distribution gateway 130 to minimize traffic on distribution infrastructure (for example, the Internet backbone). Infrequently accessed multimedia content can be serviced from the archive gateway 122 for delivery through the distribution gateway 130. The system processor 128 of the distribution gateway 130 can regularly evaluate operations of the multimedia delivery system 100 to optimize storage of the distribution gateway 130. Optimizing storage of the distribution gateway 130 can minimize overall costs by trading off storage of the distribution gateway 130 for distribution infrastructure transportation costs.

Figure 6:
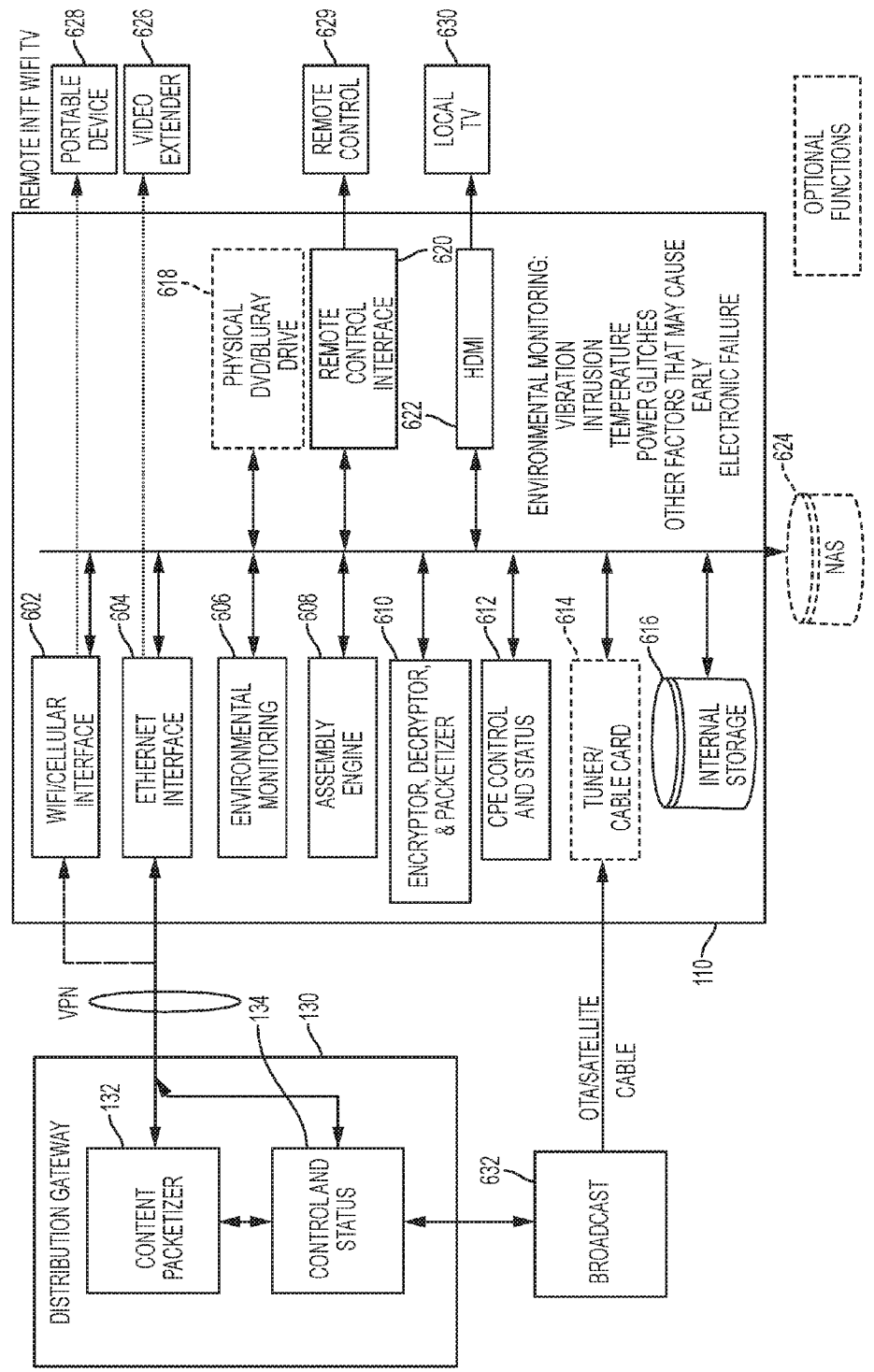
FIG. 6 illustrates a block diagram of an example CPE, in accordance with one or more possible embodiments.

FIG. 6 illustrates a block diagram of an example CPE 110, in accordance with one or more possible embodiments. In particular, the CPE 110 can include a Wi-Fi/Cellular interface 602, an Ethernet interface 604, an environmental monitoring module 606, an assembly engine 608, an encryptor, decryptor, & packetizer 610, a CPE control and status module 612, a tuner (for example, over-the-air tuner)/cable card (for example, satellite and/or cable) module 614, and internal storage 616. The CPE 110 can further include a DVD/Blu-ray drive 618, a remote control interface 620, and an HDMI interface 622. All of the components of the CPE 110 can be inter-coupled with one another. The CPE 110 can be coupled to an external network attached storage (NAS) device 624. The remote control interface 620 can communicate with a remote control 629. The HDMI interface 622 can be coupled to a local television 630. The assembly engine 608 can retrieve at least one of multimedia content and advertisements from the internal storage 616 and/or the NAS device 624 and output the at least one of multimedia content and advertisements to a display device, such as local television 630, for viewing by the subscriber 105.

The CPE 110 can be a "set-top" box that can provide a mechanism to store and display multimedia content (and advertisements) across a variety of devices, shown in FIG. 6. The CPE 110 can interact with the distribution gateway 130 and the subscriber 105 to coordinate the viewing of multimedia content. Although the multimedia delivery system 100 can stream multimedia content, the primary mode of operation is to display multimedia content that has been pre-stored on the CPE 110. An advantage of pre-storing multimedia content on the CPE 110 is to reduce peak distribution infrastructure bandwidth requirements and eliminate susceptibility to momentary glitches in network delivery of the multimedia content.

The CPE 110 can have a primary CPE 110 account for bill paying, overall price control, and parental controls, as well as defining underlying individual profiles for viewing preferences and selections. In addition, an individual CPE 110 can have multiple primary accounts that can allow for separate billing.

The CPE 110 can store all preloaded multimedia content in an encrypted state until the CPE 110 receives a subscriber 105 requested to display the multimedia content. After viewing, any unencrypted buffered multimedia content can be purged, again leaving only the encrypted multimedia content resident on the CPE 110. The CPE 110 can accept broadcast delivery via tuner/cable card module 614 from one or more broadcast infrastructure 632 (for example, over-the-air, satellite, and/or cable). In addition, the CPE 110 can be preloaded for general resale with popular current multimedia content so the subscriber 105 can start using the CPE 110 immediately without needing to stream and/or download the multimedia content prior to viewing. The preloaded multimedia content can also include a variety of promotional videos or content.

The WiFi/cellular interface 602 and Ethernet interface 604 can provide network interfaces to the distribution gateway 130 via the service provider 160 of the subscriber 105. In addition, these interfaces can be used to connect to a video extender 626 and one or more portable devices 628 to the CPE 110. The video extender 626 can be a stripped down CPE 110 that allows the CPE 110 to transfer video content to multiple televisions, simultaneously. The CPE 110 can directly transfer and store multimedia content on portable devices 628 for subsequent display of the multimedia content. The environmental monitoring module 606 can monitor for vibration, intrusion, temperature, power glitches, and any other factors that may cause an electronic failure with the CPE 110.

The CPE 110 can use, for a multicast or any one-to-many multimedia content and/or advertisements delivery system, a unique encryption key and a common or general decryption key to decrypt multimedia and/or advertising content, if required. Once the CPE 110 receives the unique encryption key and the general decryption key, the CPE 110 can decrypt the multimedia and/or advertising content with the general decryption key and re-encrypt the multimedia and/or advertising content with the unique encryption key prior to placing the multimedia content in the internal storage 616 or the external NAS 624 device. The distribution gateway 130 can transmit to the CPE 110 information required to perform the multicast decryption and unique re-encryption per CPE 110 prior to placing the multimedia content and/or advertisements in storage. In response to a subscriber 105 request to play the multimedia content with the CPE 110, the distribution gateway 120 can transmit a unique decryption key to the CPE 110 that permits the CPE 110 to decrypt and play the multimedia content on the CPE 110.

The subscriber 105 can initiate actions at any time during viewing of selected multimedia content with the CPE 110. These actions can include Pause/Resume, Fast Forward, Rewind and AdSkip. Each action modifies assembly instruction differently subject to a set of predetermined, programmable rules. In addition, the subscriber 105 can vote on individual advertisements with the potential to receive subsidies to offset the price of the multimedia content.

In each subscriber-initiated action, the CPE 110 can save the multimedia content state and capture the Time of Day (ToD) and the elapsed time from start of multimedia content viewing Tcs. At the start of multimedia content, Tcs can equal the current ToD and at the end of content Tce can equal the then current ToD. The ToD can include the time stamp of the day count (can be referenced to Jan. 1, 2015) and time (referenced from 0000 hours) and can be locked to an external, system time reference such as the NIST Time Server. Any subscriber 105 initiated action can carry both a ToD and a value relative to the Tcs. The ToD can include a day count starting at a multimedia system 101 defined point (can be referenced to Jan. 1, 2015).

Pause/Resume can allow the subscriber 105 to pause multimedia content and/or advertisement viewing and then resume multimedia content viewing when ready. Fast Forward can allow the subscriber 105 to fast forward the multimedia content and/or advertisement to a selected point and resume viewing. Associated with the Fast Forward action is a visual and/or timing (using the Tcs) cues to allow the subscriber 105 to find the desired point within the multimedia content and/or advertisement and resume viewing from that point. Rewind allows the subscriber 105 to find and replay a previously viewed point in the multimedia content and/or advertisement. Again, associated with the Rewind action is a visual and/or timing (using the Tcs) cues to allow the subscriber 105 to find the desired point and replay the multimedia content and/or advertisement.

AdSkip allows the subscriber 105 to skip a selected advertisement. Since the subscriber 105 can select the number of advertisements inserted into any given multimedia content, this feature is preferably limited. AdSkip can impact the potential advertiser 150 subsidy, and therefore the subscriber 105 costs within the multimedia system 101. The CPE 110 can provide an Advertisement Skip Button for particularly undesirable advertising. This feature can be implemented as permanent commercial skipping for the particular advertisement. This information can be transmitted back to the advertiser 150. If insufficient advertising subsidy remains to meet the subscriber's 105 requested subsidy, the CPE 110 can flash up on a display the cost impact of the commercial skip, indicate that additional advertisements might be needed to be viewed to make up for the skipped advertisement, or a combination of the two.

The Pause/Resume action can be implemented with the CPE 110. When the subscriber 105 presses and activates the Pause/Resume button on a remote of the CPE 110 (using a remote control), the CPE 110 can immediately pause the multimedia content and/or advertisement at that point, and capture and saves the content state (including the ToD and Tcs). The time of action Ta is the content elapsed time from Tcs (when the content was paused). Additionally, a ToD can be assigned to the time of action. If the Ta of the resume minus the Ta of the pause is less than or equal to a maximum allowed pause interval, then the subscriber 105 can resume the viewing of the multimedia content and/or advertisement. If the Ta of the resume minus the Ta of the pause is greater than this maximum allowed pause interval, then the resume functionality causes a new token to be issued by the distribution gateway 150 and the viewing of the multimedia content and/or advertisement resumes from the exact point of the pause. If the current ToD minus the Tcs exceeds the subscriber's 105 purchased viewing window, a new token purchase can be required. This decision can be provided as an option from the content provider 140. The subscriber actions, including play, pause, resume, fast forward, rewind, and ad-skip, can be reported to the system processor 128 of the system and services gateway 120 based on the time of action. The CPE 110 can capture and report actual multimedia content and advertisement viewing statistics in real-time and/or near real-time for use by the system processor 128 of the system and services gateway 120. In addition, all interactions with the subscriber web interface can be reported to the system processor 128.

The distribution gateway 130 can include a content packetizer 132 and a control and status module 134. The distribution gateway 130 can monitor and manage, e.g., subscriber 105 usage of multimedia content and data per CPE 110, billing data per CPE 110, key(s)/token(s) to enable individual CPEs 110 to record and display content, and changes in a CPE 110 router IP address as dynamic addresses changes. In addition, the distribution gateway 130 can supply a subscriber 105 web interface. The web interface can allow the subscriber 105 to select multimedia content and set preferences, to control overall monthly charges, generate advertisement insertion instructions, and provide a VPN bank to service the associated CPEs 110. The content packetizer 132 can deliver encrypted multimedia content and advertising (either encrypted or un-encrypted) to the CPE 110. In addition, the subscriber 105 may access the subscriber 105 web interface via the CPE 110 to request content play, request multimedia content recommendations, etc.

The distribution gateway 130 can have a large front end storage to hold several million hours, or more, of frequently accessed multimedia content and current advertising. In addition, the front end storage can be used to buffer archived multimedia content, from the archive gateway 122, that is less frequently accessed. This approach can be done to allow all encrypted multimedia content transfers to be handled identically, whether current or archived. The actual sizing of the front end storage is an on-going process and can regularly be calculated in the system processor 128 to trade off and optimize cost for local storage vs. transportation infrastructure delivery prices to minimize expenses for archived or "infrequent" multimedia content access. This process can add, delete, and move multimedia content between the archive gateway 122 and the distribution gateway 130.

The control and status module 134 can provide the overall coordination of the distribution gateway 130. The control and status module 130 can ensure that a subscriber 105 data use monitor, a local audit function, usage tracking and billing function, a token/Key manager, the subscriber web interface, advertising control, the VPN bank, and the content packetizer 132 all operate together without problems.

Figure 7:
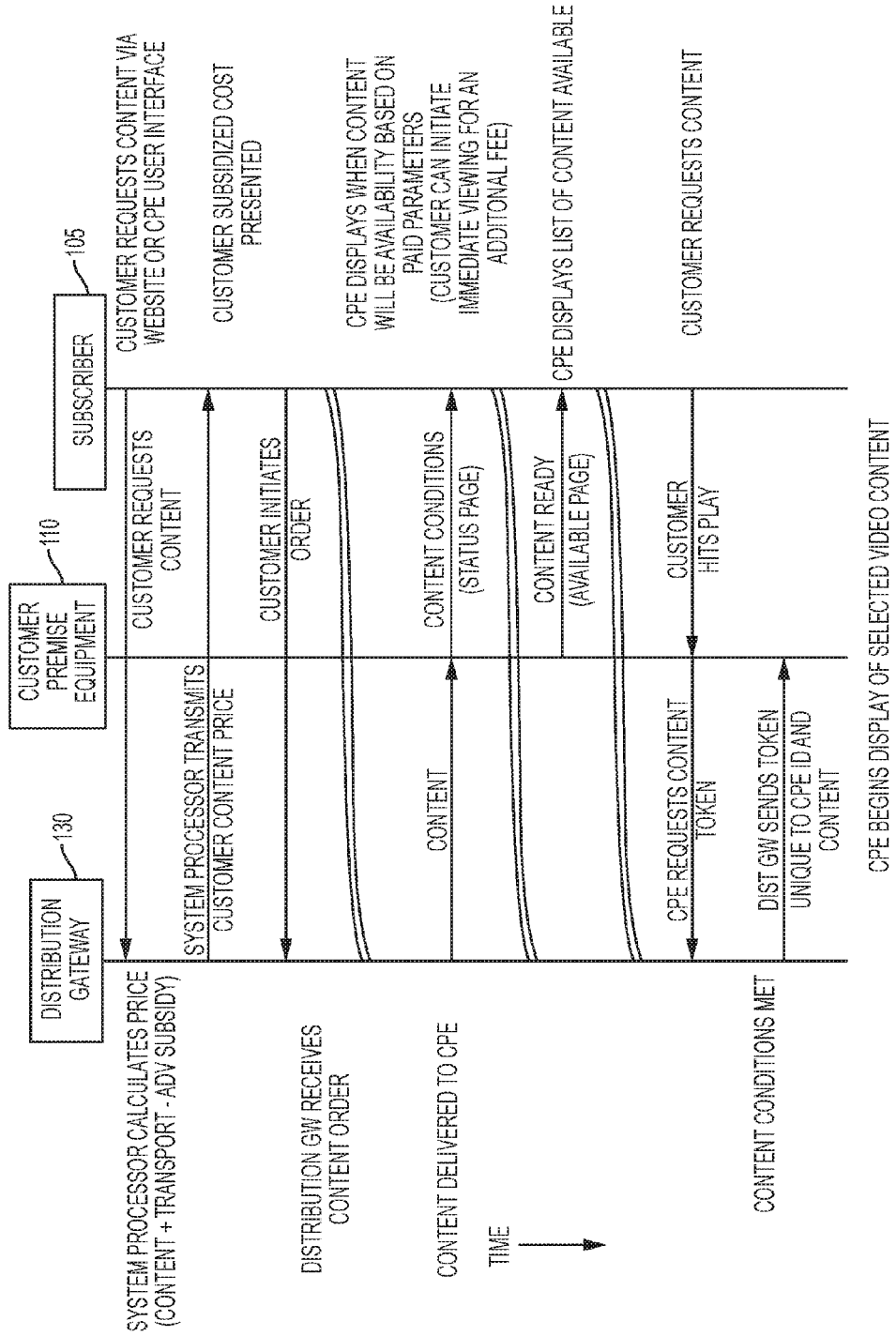
FIG. 7 illustrates an example interactive, bidirectional-exchange of information between the CPE and a distribution gateway, and between the CPE and a subscriber, in accordance with one or more possible embodiments.

FIG. 7 illustrates an example interactive, bidirectional-exchange of information between the CPE 110 and the distribution gateway 130, and between the CPE 110 and the subscriber 105, in accordance with one or more possible embodiments.

All aspects of pricing can be handled outside of the CPE 110. The CPE 110, if requested, can display the current and projected monthly billing cycle charges. In addition, a front panel LED can be set to display different colors based on used and projected multimedia content charges set against a selected threshold of the subscriber 105. As an example, green might indicate less than 75% of the selected dollar threshold utilized, yellow might indicate 76 to 100% of the selected dollar threshold utilized, and red may indicate over 100% of the selected dollar threshold utilized.

The distribution gateway 130 can receive, via the CPE 110, a subscriber 105 request for multimedia content. The subscriber 105 can send a request for multimedia content via a website or a user interface of the CPE 110. In response to such a request, the distribution gateway 130 can transmit to the subscriber 105, via the CPE 110, a plurality of prices associated with delivery of the requested multimedia content. The plurality of prices associated with the delivery can be based on a content provider 140 price for the multimedia content, an amount of lead-time of electronic delivery of the multimedia content, a time/date the multimedia content is viewed or scheduled to be viewed with the CPE 110, resolution of the multimedia content and/or a quality of the multimedia content. The plurality of prices can include any subsidies (for example, advertisements) that the subscriber 105 may receive when ordering the multimedia content. In one or more embodiments, system processor 128 can apply an additional subsidy to the subscriber content price based upon a demonstrated proof of a product purchase after the subscriber 105 viewed an associated advertising. A value of the additional subsidy can be based on whether the associated advertising is at least one of targeted, non-targeted, subscriber 105 requested, associated with a subscriber 105 identified cluster, and associated with an individual subscriber 105.

The subscriber 105 can initiate an order, via the CPE 110, to schedule delivery of the multimedia content by transmitting an "order" including selection of a price for delivery from the plurality of available prices. In response to the distribution gateway 130 receiving the order for multimedia content, the distribution gateway 130 can transmit the ordered multimedia content to the CPE 110 during a period when a delivery network of one or more of the transport providers 160 is being underutilized, for example midnight to 6 A.M. The CPE 110 can display a multimedia content conditions status page for the subscriber 105. The CPE 110 can display when multimedia content will be available for viewing based on paid parameters. The CPE 110 can display an option for the subscriber 105 to initiate immediate viewing of the multimedia content, instead of waiting until the previously scheduled view time, for an additional fee.

The CPE 110 can inform the subscriber 105 that multimedia content is ready for viewing on a display page listing available multimedia content. The subscriber 105 can request to the view the multimedia content by sending a request to the CPE 110. In one or more possible embodiments, the subscriber 105 can hit play on the remote control 629 of the CPE 110. In response to the subscriber 105 requesting to view the multimedia content, the CPE 110 can send a request to the distribution gateway 130 for a content token. As long as multimedia content viewing conditions are met, the distribution gateway 130 can respond to such a request by sending a token unique to a requesting particular CPE 110 identifier and the particular multimedia content about to be viewed by the subscriber 105. The CPE 110 can receive such a unique token and begin display of selected multimedia content.

The multimedia system 101 can provide for interactive, bidirectional-exchange of control information between the subscriber's CPE 110 and the distribution gateway 130, for example within the VPN 505 network infrastructure, as shown in FIG. 5. From a perspective of the subscriber 105, this control can include downloaded multimedia content identification, subscriber viewing choices and preferences (general and content-specific), and additional control parameters that flow from the CPE 110 to the distribution gateway 130. From the perspective of the distribution gateway 130, this control can include pricing based on subscriber 105 choices and alternate pricing strategies, which can lower the price of multimedia content. Additional information (for example, billing) can also pass through the VPN 505.

Figure 8:
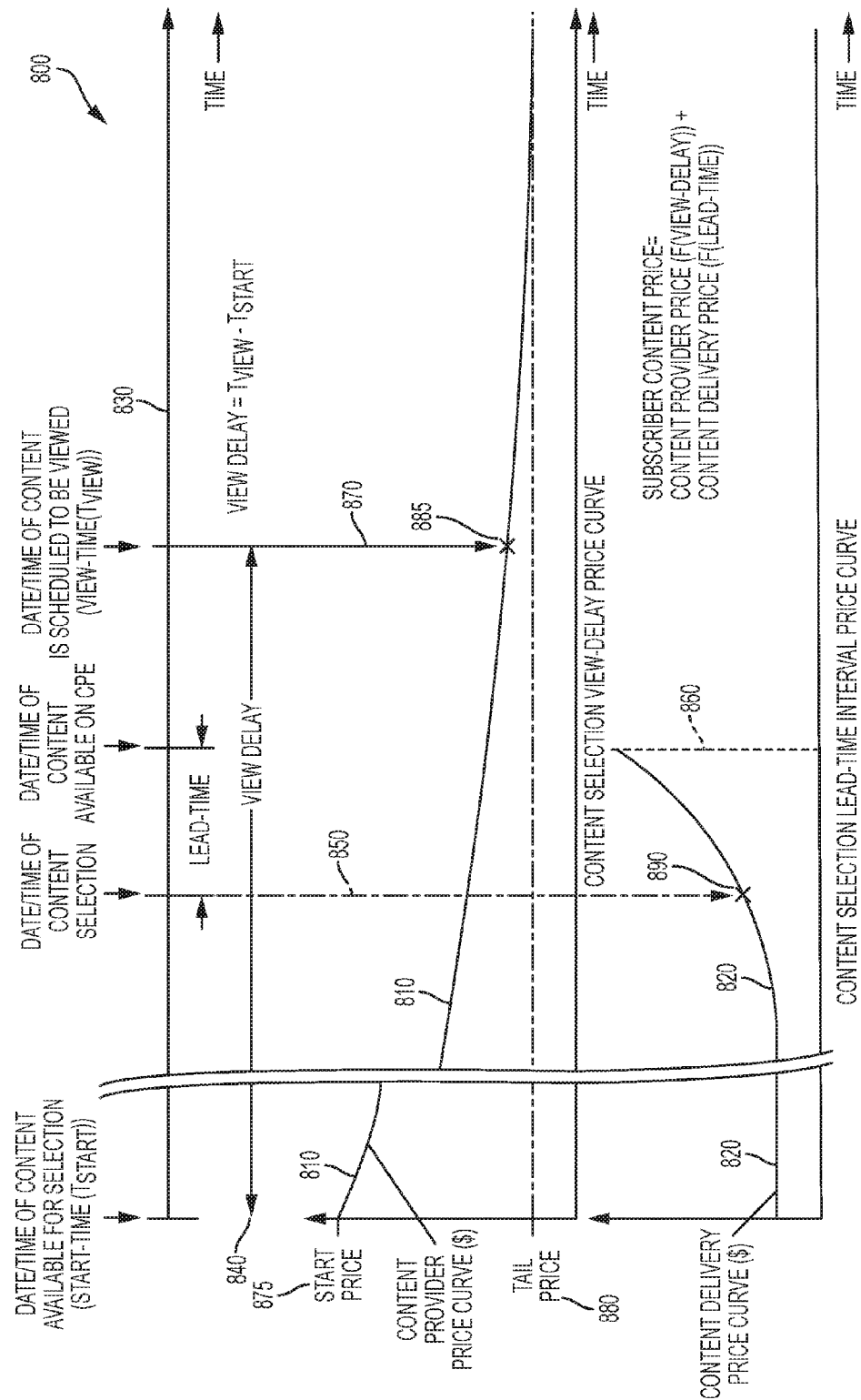
FIG. 8 illustrates an example of subscriber content price timing, in accordance with one or more possible embodiments.

FIG. 8 illustrates an example of subscriber 105 multimedia content price timing 800, in accordance with one or more possible embodiments. The subscriber 105 multimedia content price timing 800 illustrates a timeline 830 showing timing for events from an earlier time to a later time comprising: a date/time of multimedia content is available for selection (start-time) 840, a date/time that multimedia content selection 850, a date/time that multimedia content is available 860 for viewing on the CPE 110, and a date/time that multimedia content is scheduled to be viewed (view-time) 870 on the CPE 110.

The subscriber content price sequence 800 can include a multimedia content provider 140 price curve 810 and a content delivery price curve 820. The content provider 140 price curve 810 can decrease as a function of the length of time from a date/time of multimedia content is available for selection (start-time) 840. The content provider 140 price curve 810 can decrease from a start price 875 that can be established at a time the multimedia content is made available for selection 840. The content delivery price, as shown with curve 820, can increase or decrease as function of lead-time (the length of time between the date/time of multimedia content selection 850 and the date/time of multimedia content is required to be available 860 on the CPE 110).

The system processor 128 can determine a lead-time by taking a difference between the time of the date/time of multimedia content being available 860 and the date/time of multimedia content selection 850. The content delivery price 890 can be determined at any instantaneous time on the content delivery price curve 820 that intersects with the date/time of multimedia content selection 850. In accordance with the principles disclosed herein, the system processor 128 can determine the lead-time and delivery time(s) that will result in the lowest price to deliver the multimedia content to the CPE 110. The system processor 128 can determine the lead-time as hours, days, a week, two-weeks, a month, quarterly for a year, and/or any other period of time that can optimize the delivery price of the multimedia content and as an outcome of this, optimizes the bandwidth of the delivery infrastructure provided by one or more transport providers 160. The multimedia content can be delivered all at once or in segmented portions to the CPE 110. The multimedia content can be delivered throughout the lead-time period to be reassembled at the CPE 110 upon completion of the delivery to the CPE 110.

The system processor 128 can determine a view-delay by taking a difference between the date/time of multimedia content is planned to be viewed (view-time) 870 and the date/time of multimedia content is available for selection (start-time) 840. The multimedia content price 885 can be determined at any instantaneous time on the content provider 140 price curve 810 that intersects with the date/time of multimedia content is planned to be viewed (view-time) 870. The system processor 128 can determine a subscriber 105 content price by adding a content provider 140 price and a content delivery price for transporting the multimedia content via one or more transport providers 160. The content provider 140 price is a function of a time at which the multimedia content is scheduled to be viewed and the actual start time for the multimedia content. The content delivery price can be a function of the lead-time of delivery via the transport provider 160 to the CPE 110.

Figure 9:
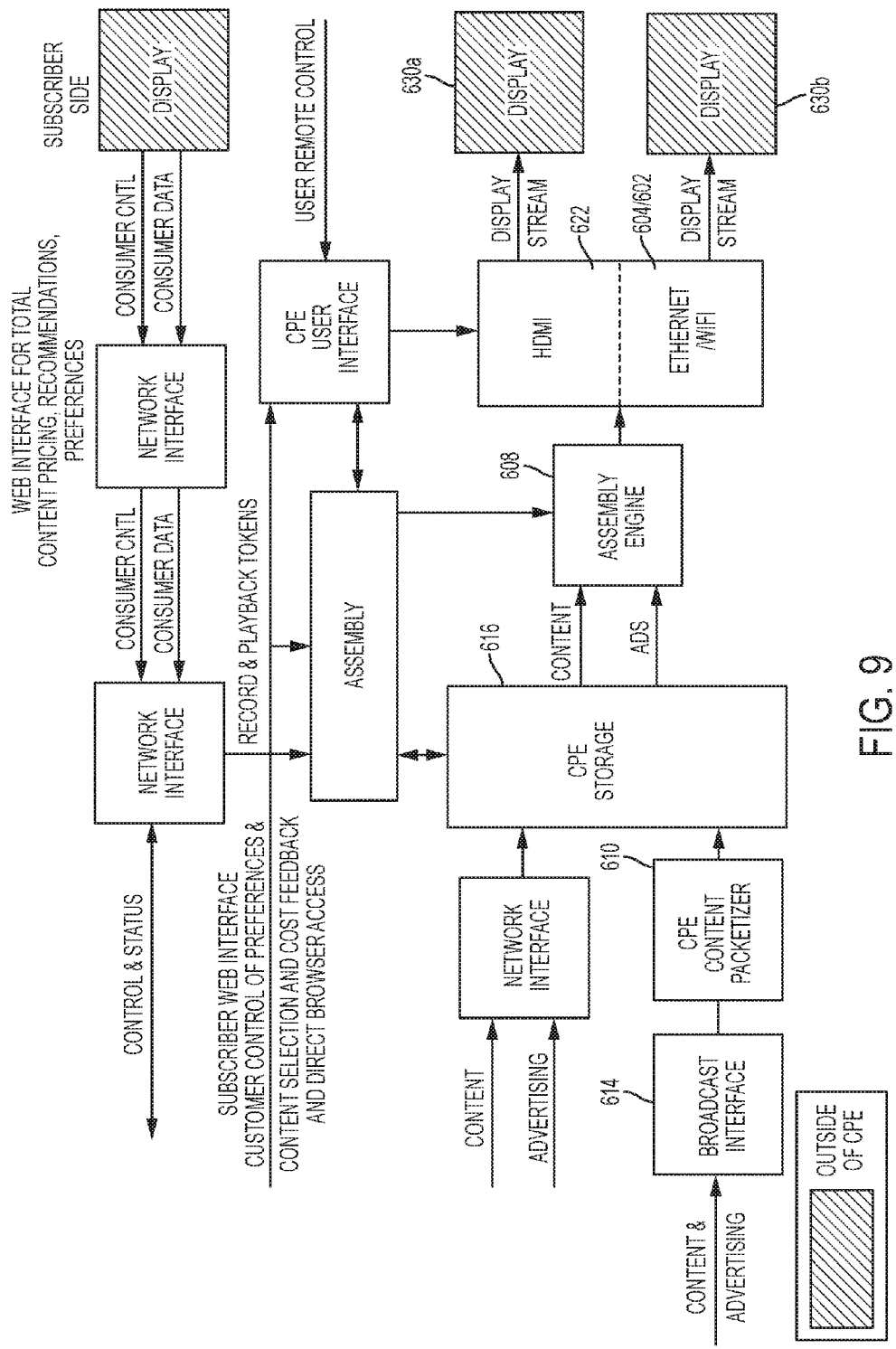
FIG. 9 illustrates a functional block diagram of the example CPE, in accordance with one or more possible embodiments.

FIG. 9 illustrates a functional block diagram of the example CPE 110, in accordance with one or more possible embodiments. The top half of FIG. 9 illustrates the control and status interaction with the subscriber 105 and distribution gateway 130. This interaction (listed in Tables 1 through 4) can include a subscriber web interface for setting up subscriber preferences, request multimedia content recommendations and selection(s), and billing. The distribution gateway 130 interface controls the preloading of content and advertising to the CPE 110, the control of content playback and advertising insertion, and CPE 110 usage for customer billing. The lower left hand side of FIG. 9 illustrates the interfaces that can load content and advertising into the CPE storage 616 via the delivery infrastructure (for example, the Internet and/or broadcast infrastructure). The lower right hand of FIG. 9 illustrates the playback control and assembly of video streams to multiple displays responding to subscriber 105 requests.

The CPE 110 can encrypt all information passing through external display interfaces to increase the security of the CPE 110. An external interface encryption key can be unique to each CPE 110 and particular multimedia content. The CPE 110 can be manufactured with a special epoxy or other adhesive to prevent integrated circuit (IC) delidding that could allow the internal decryption keys to be read.

The CPE 110 can maintain a log of all CPE 110 events to provide viewing historical feedback about/for the subscriber 105. This can include a list of all content advertising viewed, graphical representation of cost/price as a function of time, price or program rating histograms, or other useful feedback. This historical feedback can be on a per profile basis or as a profile summary for the CPE 110.

Figure 10:
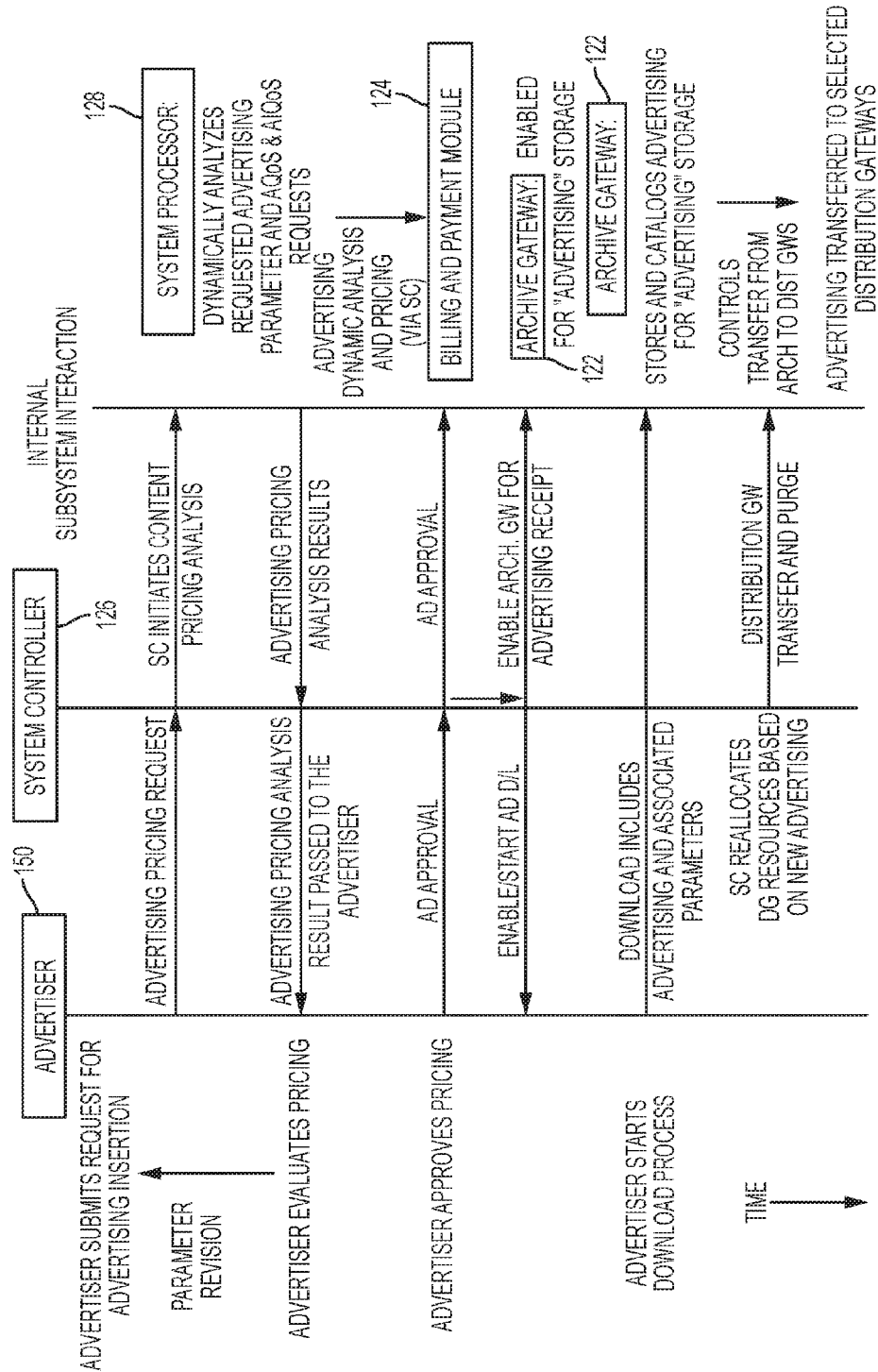
FIG. 10 illustrates example interaction between an advertiser and the system controller, and between the system controller and internal subsystems of a system and services gateway, in accordance with one or more possible embodiments.

FIG. 10 illustrates example interaction between the advertiser 150 and the system controller 126, and between the system controller 126 and internal subsystems of the system and services gateway 120, in accordance with one or more possible embodiments.

The advertiser 150 can transmit an advertising pricing request to the system controller 126. In response to such a request, the system controller 126 can pass such information to the system processor 128 to initiate an advertising pricing analysis. The system processor 128 can analyze requested advertising parameter(s), AQoS request, and AIQoS. The system processor 128 can transmit advertising pricing analysis results to the system controller 126. The system controller 126 can transmit the advertising pricing analysis results to the advertiser 150. The advertiser 150 can approve pricing for advertising by transmitting approval to the system controller 126. The system controller 126 can transmit such an approval to the billing and payment module 124.

The system controller 126 can transmit a request to the advertiser 150 to enable/start an advertising download. The system controller 126 can enable the archive gateway 122 to receive the advertising for storage. The advertiser 150 can transmit the advertising and associated parameters to the archive gateway 122 via the system controller 126. The system controller 126 can reallocate distribution gateway 130 resources based on new advertising. The system controller 126 can transfer the advertising from the archive gateway 122 to selected distribution gateway(s) 210 and send instructions to the distribution gateway(s) 210 to purge any advertisements that are no longer being used by the advertisers 150.

Figure 11:
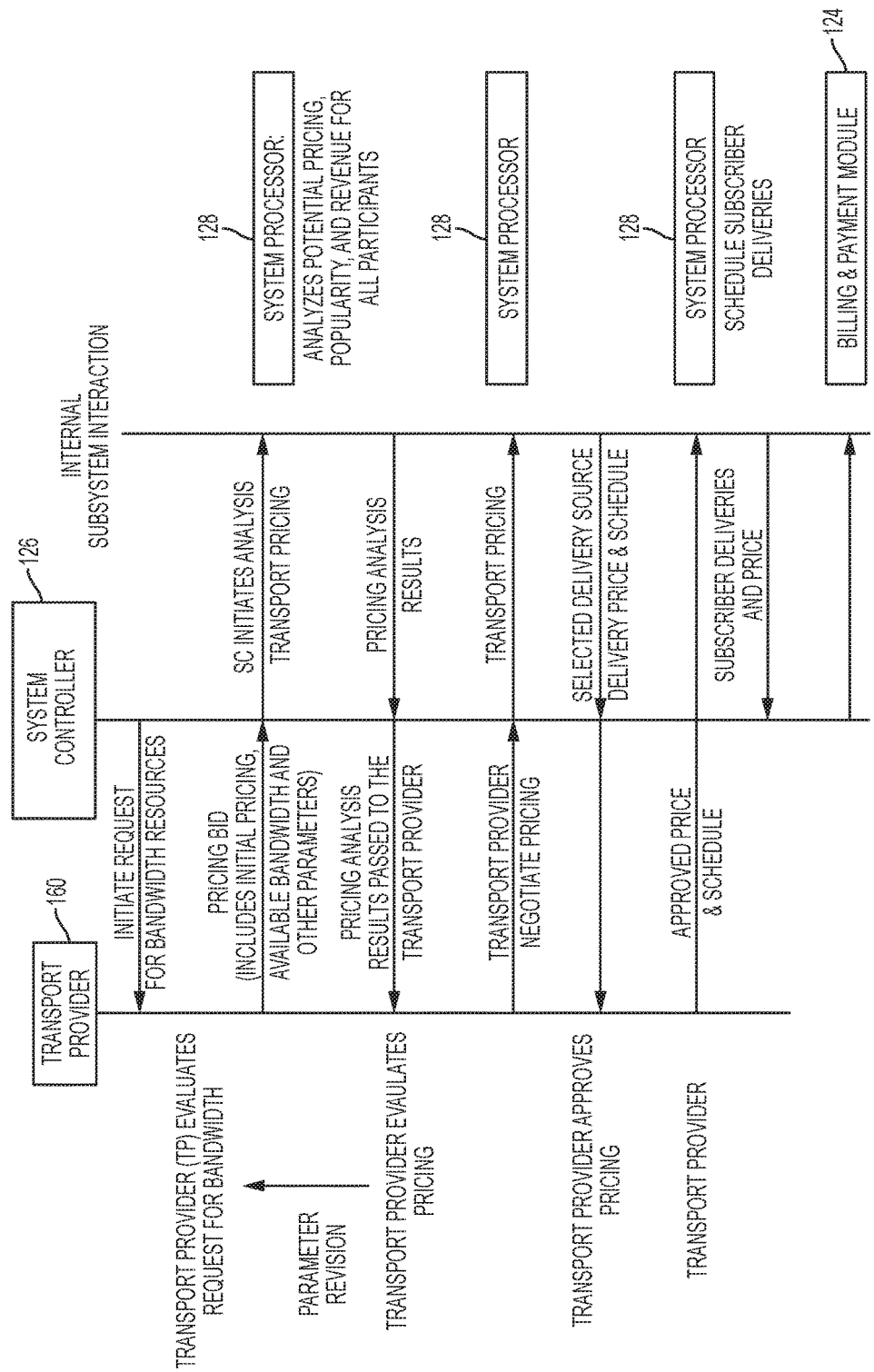
FIG. 11 illustrates an example interaction between a transport provider and the system controller, and between the system controller and internal subsystems of the system and services gateway, in accordance with one or more possible embodiments.

FIG. 11 illustrates an example interaction between the transport provider 160 and the system controller 126, and between the system controller 126 and internal subsystems of the system and services gateway 120, in accordance with one or more possible embodiments.

The transport provider 160 can receive a request for bandwidth resources from the system controller 126. The transport provider 160 can evaluate the request for bandwidth and respond with a pricing bid to the system controller 126. The pricing bid can include initial pricing of the bandwidth requested, available bandwidth, and any other parameters required to satisfy the request for bandwidth resources. The system controller 126 can initiate an analysis of delivery pricing by transmitting the delivery pricing bid to the system processor 128. The system processor 128 can analyze potential pricing, popularity, and revenue for all participants, content providers, transport providers, and advertisers, individually and jointly. The system processor 128 can send results of the delivery pricing analysis to the system controller 126.

The system controller 126 can transmit the pricing analysis results to the transport provider 160. The transport provider 160 can evaluate the electronic delivery pricing analysis and respond to the system controller 126 with negotiated transport pricing. The system controller 126 can pass the negotiated delivery pricing to the system processor 128. The system processor 128 can select a transport provider 160, a delivery price, and a delivery schedule. The system processor 128 can pass the transport provider 160, the delivery price, and the delivery schedule to the system controller 126 which transmits such information to a particular transport provider 160. The particular transport provider 160 can respond to such information by transmitting, to the system processor 128 via the system controller 126, an approval of the delivery price and the delivery schedule. The system processor 128 can schedule multimedia content delivery and pass the scheduled multimedia content delivery to the system controller 126. The system controller 126 can pass the ultimate delivery pricing to the billing and payment module 124.

Figure 12:
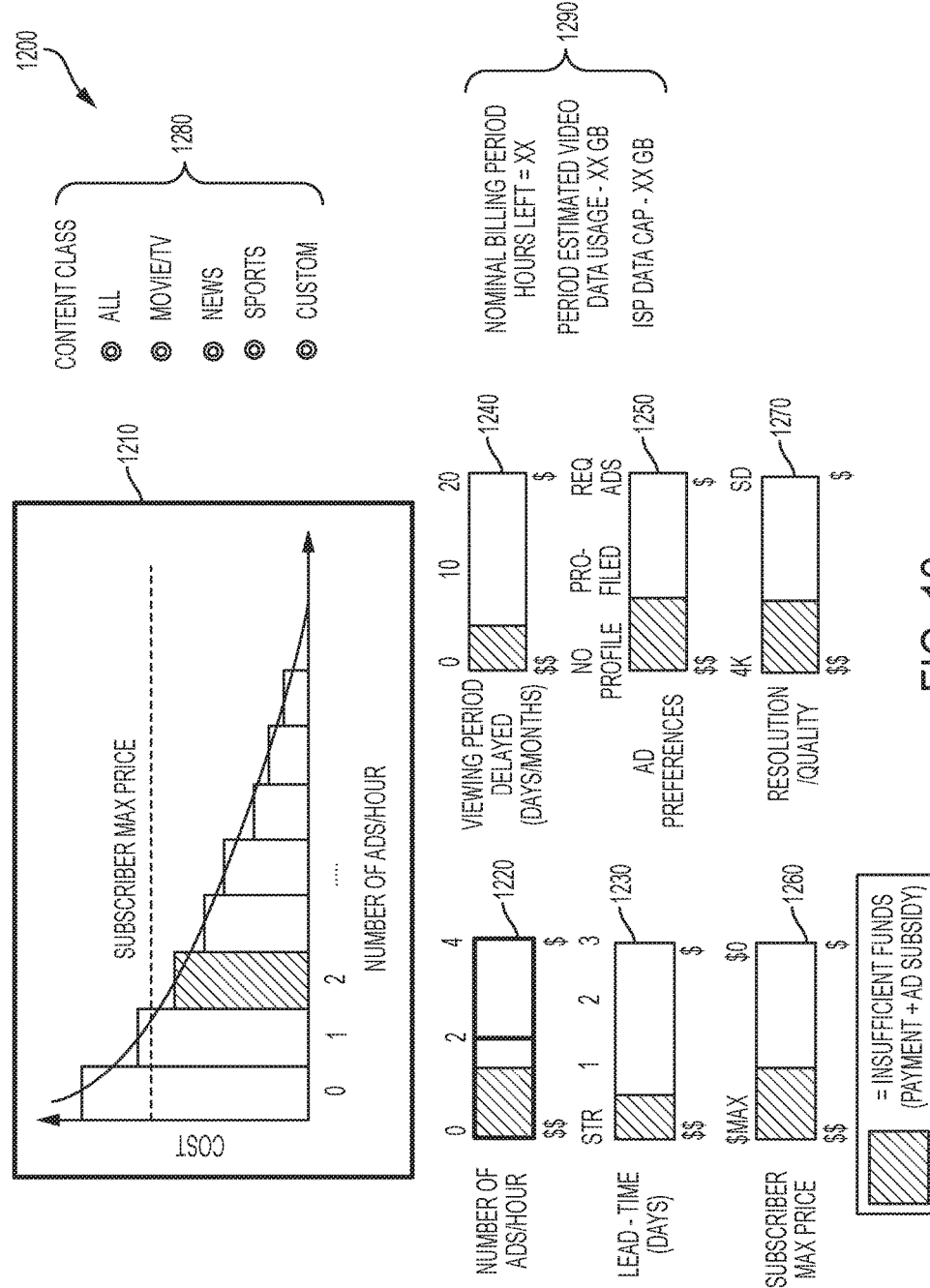
FIG. 12 illustrates an example subscriber web interface displaying preference/cost impact, in accordance with one or more possible embodiments.

FIG. 12 illustrates an example subscriber web interface 1200 displaying preference/price impact, in accordance with one or more possible embodiments.

The subscriber web interface 1200 can display monthly billing cost as a function of a number of ads per hour, lead-time, content viewing delay, and advertisement preferences. Each variable can be independently displayed showing the cost/price impact of the preference selection by the subscriber 105. Preferences can be set for all content, desired groupings of multimedia content, particular multimedia content for the subscriber 105 account, or can be further subdivided by individual profile. The subscriber 105 can also adjust price as an independent variable. The subscriber web interface 1200 can include an advertisement subsidy box 1210, an advertisement slide control 1220, a lead-time slide control 1230, a delayed viewing period since release slide control 1240, an advertisement preferences slide control 1250, a subscriber maximum cost slide control 1260, and a resolution and/or quality slide control 1270. The subscriber 105 can change any of the slide controls 1220, 1230, 1240, 1250, 1260, and 1270 and view a price result of such changes.

The subscriber web interface 1200 can further include subscriber selectable groupings. For example, the content class buttons 1280 can allow a subscriber 105 to set the groupings of multimedia content. The groupings can include classes of what particular multimedia content the subscriber 105 would make selections from. System defined content classes (for example, a default content class) can include selections for all, movie/TV, news, sports, and custom. As an example, subscriber 105 defined content class could include Movie/TV which would override the All Class setting for Movie/TV content. In addition, an individual multimedia content class would set a custom setting for a particular TV series which would override the Movie/TV settings for that particular series. The subscriber 105 web interface 1200 can further include account information 1290 for the subscriber 105, such as nominal billing period hours left information, period estimated data usage information, and ISP data cap information.

The advertisement subsidy box 1210 can display, for the subscriber 105, a maximum cost/price set by the subscriber 105. The advertisement subsidy box 1210 can display a cost/price for particular multimedia content as a function of a number of advertisements that the subscriber 105 accepts to be viewed while watching the multimedia content. The advertisement slide control 1220 can allow the subscriber 105 to set a number of advertisements to be viewed within a given period of time (for example, per hour). Changes made to the advertisement slide control 1220 can be viewed in the advertisement subsidy box 1210.

The lead-time slide control 1230 can allow the subscriber 105 to control a maximum amount of delay (lead-time) before multimedia content is to be sent to the CPE 110. The delayed viewing period since release slide control 1240 can allow the subscriber 105 to control a number of days/months until the CPE 110 allows the subscriber 105 to view particular multimedia content. Advertisement preferences slide control 1250 can allow the subscriber 105 to control a number of advertisements that are inserted into the multimedia content and presented to the subscriber 1250 when viewing particular multimedia content. The subscriber max cost slide control 1260 can allow the subscriber 105 to adjust a maximum cost that the subscriber 105 will accept for a given billing period. The subscriber web interface 1200 can include the resolution and/or quality slide control 1270 to allow the subscriber 105 to select a resolution and/or quality for particular multimedia content. The lead-time slide control 1230 is illustrated as allowing a subscriber 105 to set the lead-time as an exemplary maximum of 3 days. However, the maximum lead-time that the lead-time slide control 1230 can allow the subscriber 105 to set can be any number of days that provides adequate flexibility to the subscriber 105. For example, the lead-time slide control 1230 can allow the subscriber 105 to set the lead-time to a week, two-weeks, a month, quarterly for a year, and/or any other period of time that can optimize the delivery price of the multimedia content for the subscriber 105.

The subscriber 105 can also manually adjust their control parameters, including cost, for specific subscriber 105 or system defined classes of content for their viewing experience. These classes can be defined for individual pieces of multimedia content, a content series, or selected subset of content that can include, as examples, newer television, older television, live sports, movies, etc. and/or can provide further refinements of class such as movie, action, etc.

Figure 13:
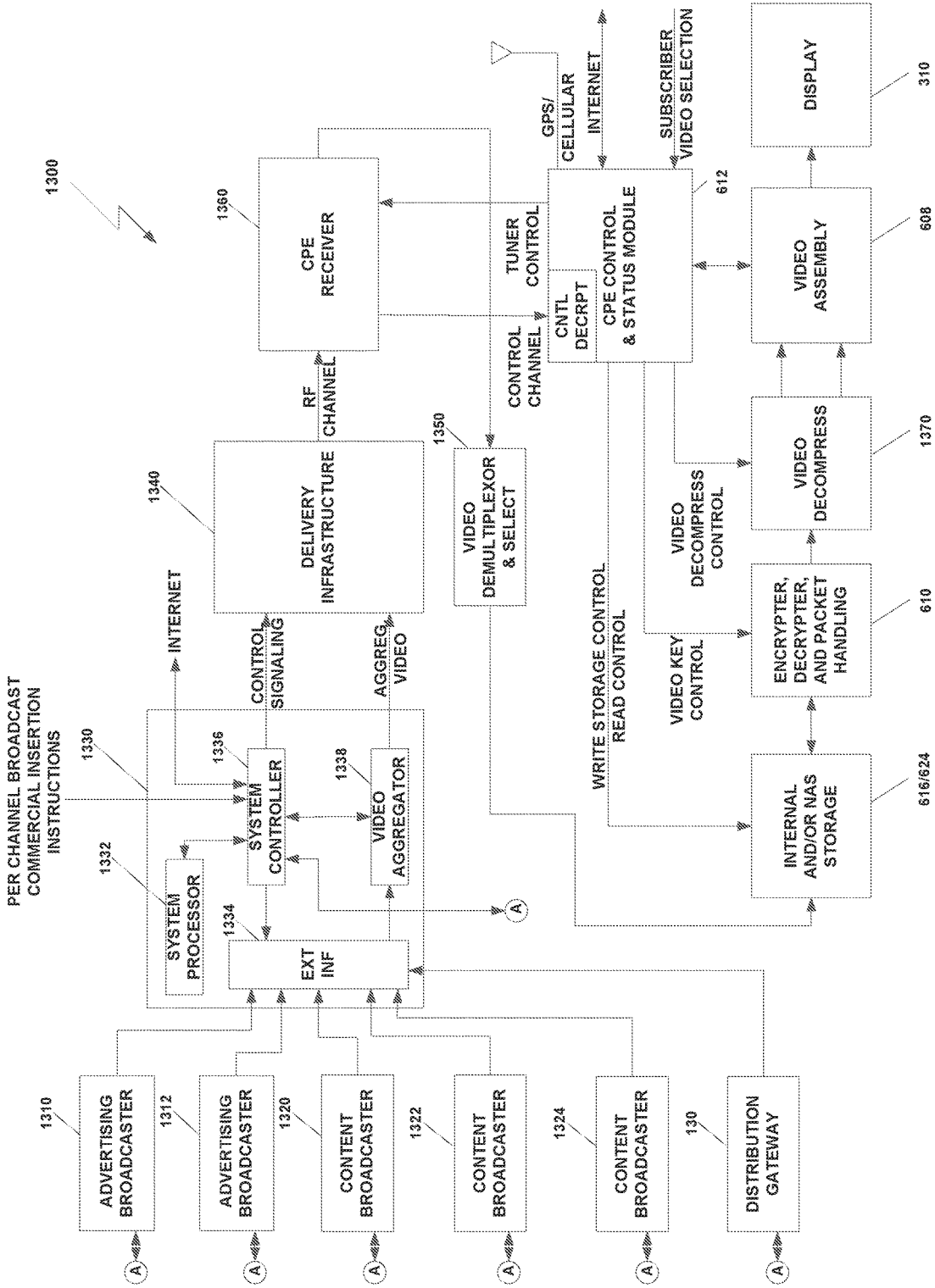
FIG. 13 illustrates an example video time-bandwidth product improvement (VTBPI) system, in accordance with one or more embodiments.

FIG. 13 illustrates an example video time-bandwidth product improvement (VTBPI) system, in accordance with one or more embodiments. The VTBPI system 1300 can include the hardware components illustrated in FIGS. 1-3, 5, 6, and 9 discussed above and further include an aggregation distribution gateway 1330, a delivery infrastructure 1340 provided by one or more transport providers 160, a high speed content decryption module 610, a video decompressor module 1370, a content reassembly module 608, and a CPE 110 control & status module 612. The aggregation distribution gateway 1330 can be coupled to the distribution gateway 130 and receive multiple content, for example from multimedia content broadcasters 1320, 1322, and 1324 and advertising broadcasters 1310 and 1312. A content broadcaster 1320, 1322 and 1324 can also operate as an advertiser broadcaster 1310 and 1312. When a distribution gateway 130 implements the aggregation functionality disclosed herein, such a distribution gateway 130 can be designated as the aggregation distribution gateway 1330. The delivery infrastructure 1340 can include at least one of multicast infrastructure, over-the-air infrastructure, cable infrastructure, satellite infrastructure, and/or any other one-to-many delivery infrastructures. The aggregation distribution gateway 1330 that can include a system processor 1332, an external interface 1334, a system controller 1336, and a video aggregator 1338. At least one transport provider 160 can utilize the delivery infrastructure 1340 to deliver content to CPEs 110 using at least one of a broadcast, unicast, multicast, torrent, peer-to-peer, and mesh architecture. Distribution of content (multimedia and/or advertising content) to CPE 110 via the delivery infrastructure 1340 is referenced herein as a VTBPI broadcast.

In accordance with one or more embodiments, the aggregation distribution gateway 1330 can implement VTBPI to automatically record multimedia content programs that will be repeated within a specified period of time, for example those that repeat within a 24 hour period. Once the multimedia content is initially recorded (with or without advertisements) by the CPE 110, if the subscriber 105 tunes to a delivery channel when a repeated show was scheduled to be broadcast via a transport provider 160, the CPE 110 can reconstruct the multimedia content programs from the previously recorded multimedia content with no discernible viewing experience difference to the subscriber 105 as compared to watching a conventional "broadcast" program, also known within the art as a linear TV program. During the "repeat time" of a given multimedia content program, the aggregation distribution gateway 1330, via delivery infrastructure 1340 that can include one or more of satellite, cellular, wired, and/or (Over-the-Air (OTA), may instead insert other information, such as public service announcements, multimedia content, or multimedia advertising into a transmission to the CPE 110.

The aggregation distribution gateway 1330 can release additional bandwidth via the VTBPI process disclosed herein to download to a specific CPE 110 or groups of CPEs 110 defined by one or more demographic clusters for advertising, advertising insertion instructions, and/or any other data to the CPE 110. This download information may also be transmitted to the CPE 110 with the aggregated stream, via the Internet, or similar structure. The extra bandwidth that is released by use of the aggregation distribution gateway 1330 implementing VTBPI may be used to download higher resolution and/or higher quality multimedia content for display with the CPE 110, as part of an enhanced broadcast, a subscription service, and/or ala carte multimedia content viewing service provided by the CPE 110 for the subscriber 105. The video aggregator 1338 of aggregation distribution gateway 1330 can multiplex broadcast multimedia content together with the multimedia content scheduled to be delivered within the scheduled lead-time discussed above. The scheduled lead-time is discussed above in relation to FIGS. 1-12. The video aggregator 1338 can further multiplex an advertisement together with the multimedia content, the advertisement being scheduled for delivered to the CPE 110 prior to presentation to the subscriber 105. Such an advertisement can be delivered, by the system controller 1336 of the aggregation distribution gateway 1330, to the CPE 110 separately from the multimedia content. The system controller 1336 of the aggregation distribution gateway 1330 can transmits an advertising insertion instruction to the CPE 110 instructing the CPE 110 where to insert the advertisement into the multimedia content. The system controller 1336 can further deliver the multiplexed broadcast multimedia content together with multimedia content delivered within the scheduled lead-time.

The aggregation distribution gateway 1330 can further reduce the required spectrum for a given delivery channel of the CPE 110 by eliminating the repetition of advertisements. The aggregation distribution gateway 1330 can maximize the VTBPI process for a given region by combining the multimedia content broadcasts of multiple channels. Such a broadcast aggregation process can be implemented using a subset of the distribution gateways 130 or via the aggregation distribution gateway 1330. The aggregation performed by the aggregation distribution gateway 1330 and/or the distribution gateway(s) 130 can be combined with advanced video compression algorithms for even greater time-bandwidth product improvement. The VTBPI combined with advanced video compression can provide a bandwidth efficiency improvement of over 3:1 compared to current OTA HDTV transmission.

The aggregation distribution gateway 1330 can more efficiently utilize RF spectrum from existing over-the-air broadcasters from the transport providers 160. The aggregation distribution gateway 1330 can make additional spectrum available for other wireless applications to delivery multimedia content. The aggregation distribution gateway 1330 can aggregate multiple broadcast channels, including encrypted content, advertising and channel control information, into a reduced number of channels. In one or more embodiments, the aggregation distribution gateway 1330 can aggregate multiple broadcast channels into a single channel stream for delivery to the CPE 110. The aggregation distribution gateway 1330 can delivery such information via the delivery infrastructure 1340. The channel control information can include advertising insertion instructions, regional overlays, logical channel assignment, program schedule, specific CPE 110 address disable instruction, and any other information to control the CPE 110.

The aggregation distribution gateway 1330 can receive multimedia content from multiple content broadcasters 1320, 1322, and 1324 and multiplex that multimedia content into a reduced number of channels. For example, multimedia content from content broadcasters 1320, 1322, and 1324 can be multiplexed into any two of the channels of the broadcasters 1320, 1322, and 1324. Thus, multiplexing multimedia content from three content broadcasters 1320, 1322, or 1324 into reduced number of channels can free up the spectrum of the third channel for other wireless applications by eliminating the repeated delivery of advertisements. For OTA delivery, multiple aggregation distribution gateways 1330 can be used in areas with overlapping coverage. For satellite, cellular, and/or cable delivery, a single aggregation distribution gateway 1330 can be used for areas of overlapping coverage. The aggregation distribution gateway 1330 can provide a low speed control channel with a higher level of encryption delivered as a separate channel or multiplexed into the multimedia content channel. The aggregation distribution gateway 1330 can assemble the multimedia content into logical channels for reassembly by the CPE 110 once received. For each aggregation channel, the low speed control channel can provide the video channel data rate, logical channel definition, content decryption keys, and any other information that can be used to control video reassembly for each aggregation of multimedia content in the CPE 110. The control channel can be used to provide a multilayer authentication process to improve the encryption protection of the multimedia content that can be tied to the specific CPE 110. The aggregation distribution gateway 1330 can transmit a broadcast decryption key and a CPE 110 specific encryption key associated with particular multimedia content and the particular CPE 110 and used to encrypt the multimedia content prior to storage in the CPE 110.

The aggregation distribution gateway 1330 can receive an advertising schedule and forward the advertising schedule via the advertising insertion instructions to the CPE 110. The advertising insertion instructions can be delivered at any time prior to viewing of the advertising with the CPE 110 of the subscriber 105. The delivery of the advertisements can be 1) multiplexed with an aggregated video channel, 2) included with the low speed control channel and/or 3) delivered via the Internet. Advertising delivery can be performed as required with advertisements being repeatedly played from the internal storage 616 and/or the NAS device 624 of the CPE 110. The aggregation distribution gateway 1330 can also generate advertising insertion instructions on a per channel basis, as well as per subscriber 105. The CPE 110 can generate reassembled multimedia content based on the information included in the advertising insertion instructions. Regardless of the resolution of the content channel, the CPE 110 can insert advertising at a same or higher resolution than the channel's content resolution. In the event of a storage 616 and/or 624 failure in the CPE 110, the CPE 110 can insert recently received, non-targeted advertising into the reassembled video stream.

The transport providers 160 can have different operational modes dependent on a particular delivery infrastructure 1340 being used. For example, in the case of OTA there may be multiple transport (aggregated broadcast) antennas for a given area. For satellite delivery, multiple satellites can be used with a single aggregation distribution gateway 1330. For cellular delivery, multiple cellular providers can service a single aggregation distribution gateway 1330. For cable delivery, delivery can rely on an existing wiring infrastructure currently in place.

The CPE receiver 1360 of the CPE 110 can be multi-channel and can demodulate received data. The buffering and storage of the multimedia content and advertisements is under control of the CPE 110 control & status module (CCSM) 612. The CPE receiver 1360 associated with the VTBPI can receive a high data rate digital data that can be demultiplexed to isolate the individual channels. With the tuner/cable card 614 in the CPE 110, the tuner/cable card 614 can demodulate individual channels. Certain implementations of tuners/cable cards 614 can operate as a multi-channel tuner, with such implementations still operating on individual channels. The demodulation and storage can be done automatically by the CPE 110 for all aggregated broadcasts received. The video demultiplexer 1350 can demultiplex the demodulated content, the selected demodulated content being multimedia content and/or advertising content. Once a subscriber 105 selects a particular multimedia content for playback, the CCSM 612 can send content decryption keys received by the CCSM 612 to the decryptor module 610 for processing that particular multimedia content at the start time of the multimedia content defined by the content broadcaster 1320, 1322, and/or 1324. After decryption, video decompressor 1370 of the CPE 110 can decompress the multimedia content and provide such decompressed multimedia content to the content reassembly module 608. This same process can be implemented for advertisements. The content reassembly module 608 can use the advertising insertion instructions to insert the advertisements into the multimedia content to emulate standard television broadcasting that serially transmits the advertisements with associated multimedia content. The content reassembly module 608 can use the advertising insertion instructions to insert the advertisements into the multimedia content to provide advertising that is tailored to the subscriber 105.

The CPE 110 can report its video and control link reliability (satellite or enhanced OTA operation) when feedback is available via a data network, for example, Internet, satellite Internet, a back channel, cellular, and/or any other data network that allows reporting of the reliability. Such reliability information can be reported to distribution gateway. This feedback can be used to calculate, prior to multimedia content viewing, a need to rebroadcast critical control information, reformulate transmitter beam patterns, or any other information/functions to improve overall link reliability.

Table 9 lists VTBPI broadcast transmission options. These options can include a single multimedia content broadcaster and/or a single advertiser broadcaster with multiple sub-channels, cooperative content broadcasters that can form their own aggregations, and/or regional broadcast aggregator.

TABLE 9

VTBPI Options

| Option | Description |
| --- | --- |
| Single Broadcaster | A single broadcaster with multiple sub-channels can reduce a required RF spectrum by eliminating transmission of repeated advertisements. |
| Cooperative Broadcaster Aggregation | For example, three broadcasters can operate using the spectrum of two broadcasters by eliminating the embedded advertisements (~1/3 of the broadcast time) and the CPE can reinsert advertisements inthe displayed video stream. |
| Regional Broadcast Aggregator(s) | A regional broadcast aggregator can combine the content from multiple broadcasters into a high data stream or streams to aggregate many channels. This method can also reduce the number of tuners required in a CPE and reduce the amount of spectrum used for frequency guard bands. |
| National Broadcast Aggregator(s) | A national broadcast aggregator can combine the content from multiple broadcasters into a high data stream or streams to aggregate many channels that may provide regional and national coverage. This method can also reduce the number of tuners required in a CPE and reduce the amount of spectrum used for frequency guard bands. |

The options shown in Table 9 can be implemented in a subset of the distribution gateway 130 to pre-deliver VTBPI multimedia content to CPEs 110. A subset of the CPE 110 functionality previously described herein can be used to implement VTBPI functionality. A subset of the distribution gateway 130 functionality described herein can be located within a broadcaster's facility. The video aggregation disclosed herein can allow for use of logical channels, such that the subscriber 105 can use the same use currently assigned HDTV OTA or satellite channel that the subscriber 105 are already accustomed to using. The channel number is simply an arbitrary logical channel from the standpoint of the CPE 110, however such a channel number can provide for backwards compatibility that reduces subscriber retraining. The use of cooperative and regional broadcast aggregation disclosed herein can further reduce spectrum use by eliminating the need for spectral guard bands between individual channels.

Figure 14:
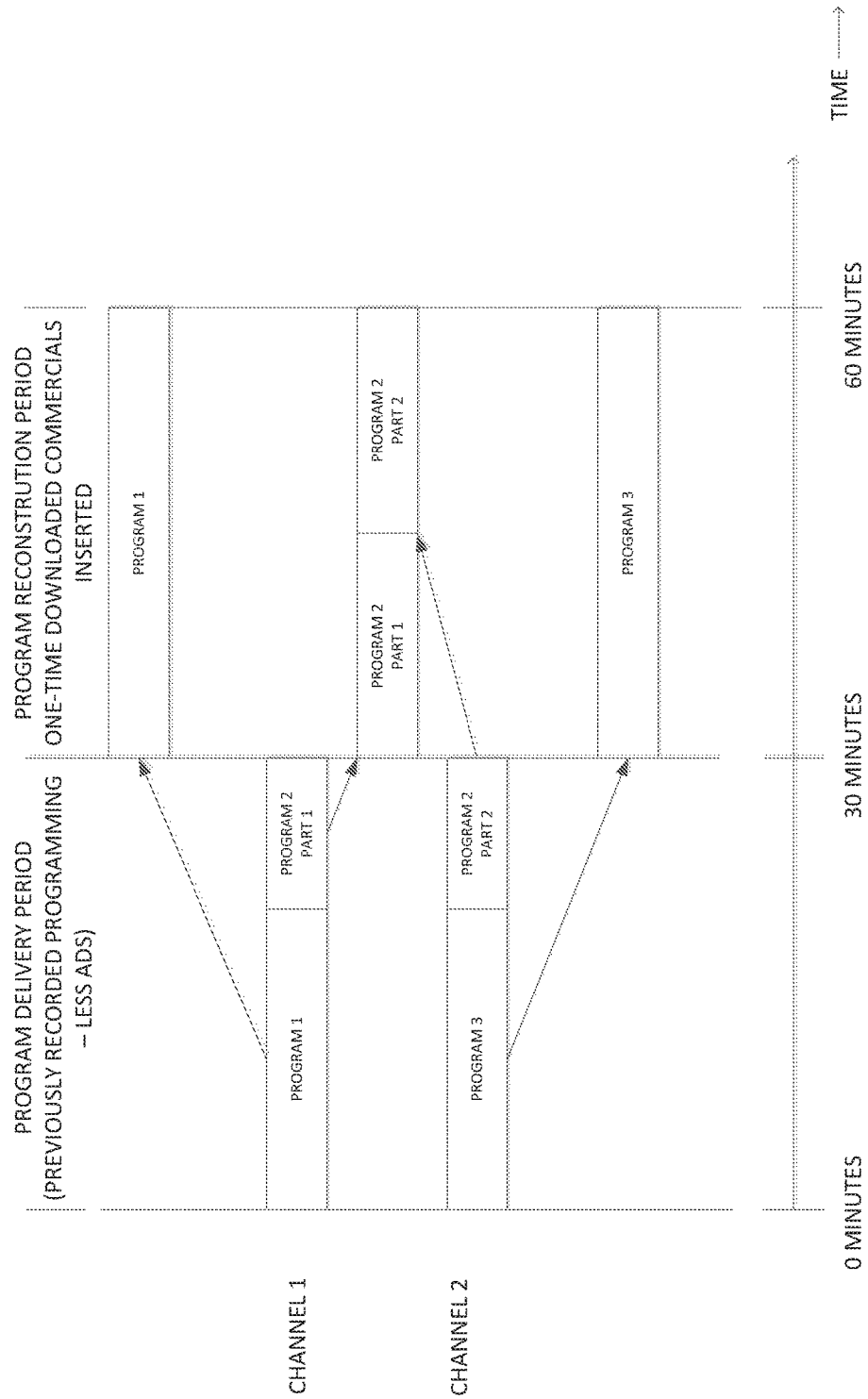
FIG. 14 illustrates an example VTBPI timetable, in accordance with one or more embodiments.

FIG. 14 illustrates an example VTBPI timetable, in accordance with one or more embodiments. FIG. 14 shows an example VTBPI timetable in which the aggregation distribution gateway 1330 can delivery three (3) programs of multimedia content, that conventionally included embedded advertisements, in the time-bandwidth product that is conventionally required to delivery two (2) programs of multimedia content. The aggregation distribution gateway 1330 can implement VTBPI, as discussed above, to deliver multimedia content to the CPE 110 with individual multimedia content being broken into smaller blocks, which can minimize an amount of storage required in at least one of the internal storage 616 and the NAS 624 device of the CPE 110 for buffering. As the multimedia content blocks become sufficiently small, the operation of multimedia content block delivery approaches the operation of a statistical multiplexor. The removal of advertising provides nearly 50% improvement in bandwidth efficiency compared to a statistical multiplexor with embedded advertising.

The aggregation distribution gateway 1330 can coordinate the VTBPI functions disclosed herein with the functions performed by the distribution gateway 130 discussed above for FIGS. 1-12. For example, the aggregation distribution gateway 1330 can coordinate its functions with the distribution gateway 130 to transmit the aggregated and multiplexed multimedia content within the lead-time determined by the system and services gateway 130 and by at least one transport provider 160. In addition, the pricing of multimedia content as a function of the view-time, as well as, subscriber 105 preference operation discussed above can be included in the functionality of the aggregation distribution gateway 1330, with, as discussed above, the system processor 128 may be implemented in the distribution gateway 130 and now referred to as the aggregation distribution gateway 1330.

Figure 15:
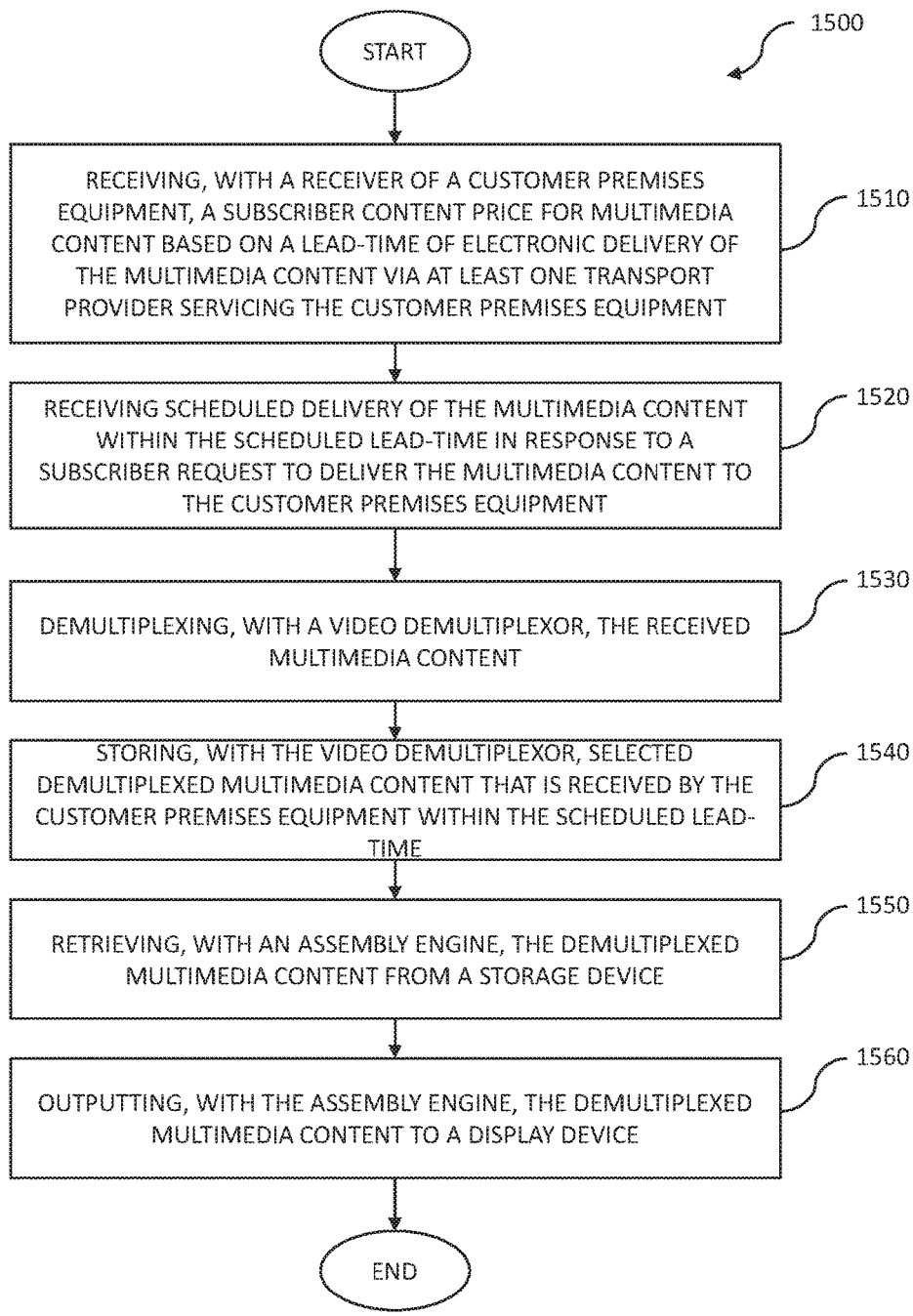
FIG. 15 illustrates a flowchart of an example method of receiving VTBPI multimedia content, in accordance with one or more possible embodiments.

FIG. 15 illustrates a flowchart of an example method 1500 of receiving VTBPI multimedia content, in accordance with one or more possible embodiments. The method 1500 is not limited to the example blocks shown and can include any of the processes performed by the multimedia delivery system 100.

The method 1500 can begin with block 1510. The method 1500 can begin by receiving multimedia content at the CPE 110. The CPE receiver 1360 of the CPE 110 can receive multimedia content that is directed to a plurality of CPEs 110 from the aggregation distribution gateway 1330. In at least one embodiment, the CPE receiver 1360 can receive multimedia content and/or advertisements from the Internet. Such multimedia content can include at least one of multimedia content from multimedia content broadcasters 1320, 1322, and 1324 and advertisements received from one or more of the advertising broadcasters 1310 and 1312. Block 1510 can proceed to block 1520.

At block 1510, the method 1500 can receive a subscriber content price. The CPE 110 can receive a subscriber 105 content price, for multimedia content, based on a scheduled lead-time of electronic delivery of the multimedia content. The CPE 110 can receive the subscriber 105 content price via any of the CPE receiver 1360, the Wi-Fi/Cellular interface 602, the Ethernet interface 604, and/or any other communication received available to the CPE 110. The multimedia content can be delivered via at least one transport provider 160 servicing the CPE 110. Block 1520 can proceed to block 1530.

At block 1520, the method 1500 can receive scheduled delivery of the multimedia content. The CPE 110 can receive, via the CPE receiver 1360, scheduled delivery of the multimedia content within the scheduled lead-time. Such reception can be in response to a subscriber 105 request to deliver the multimedia content to the CPE 110. Block 1520 can proceed to block 1530.

At block 1530, the method 1500 can demultiplex multimedia content. The video demultiplexor 1350 can demultiplex the multimedia content received in block 1520. Block 1530 can proceed to block 1540.

At block 1540, the method 1500 can store the selected demultiplexed multimedia content. The video demultiplexor 1350 can store the selected demultiplexed multimedia content that is received by the CPE 110 within the scheduled lead-time. Block 1540 can proceed to block 1550.

At block 1550, the method 1500 can retrieve a particular stored multimedia content. The assembly engine 608 of the CPE 110 can retrieve the multimedia content demultiplexed with block 1520. The assembly engine 608 of the CPE 110 can retrieve the multimedia content from at least one of the internal storage 616 of the CPE 110 and the NAS device 624 coupled to the CPE 110. Block 1550 can proceed to block 1560.

At block 1560, the method 1500 can output the particular assembled multimedia content. The assembly engine 608 of the CPE 110 can output the assembled multimedia content to a display device, such as the television 630 locally coupled to the CPE 110.

Although the embodiments are directed toward the delivery of multimedia content, the teachings of the embodiments can be applied to any electronic paid content being served over a network or encrypted broadcast. The embodiments can be extended to traditional print media, on-line training, etc. One or more of the embodiments can even use a micro-payment system.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean one, some, or all, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A customer premises equipment, comprising:
   a receiver to receive multiplexed multimedia content and advertisement, and an insertion instruction, the multiplexed multimedia content and advertisement being received over a reduced number of broadcast channels reduced from a greater number of broadcast channels greater than the reduced number of broadcast channels, the multiplexed multimedia content and advertisement eliminating repetition of the advertisement within the reduced number of broadcast channels;
   a video demultiplexor to demultiplex the received multiplexed multimedia content and advertisement from the reduced number of broadcast channels to produce a multimedia content and an advertisement and store, within a storage device, the multimedia content and the advertisement; and
   an assembly engine to retrieve the multimedia content and the advertisement from the storage device and insert the advertisement into the multimedia content based on the insertion instruction, and output the multimedia content and the advertisement to a display device.

2. The customer premises equipment according to claim 1, wherein the receiver receives the multiplexed multimedia content and advertisement, and the insertion instruction, via at least one transport provider servicing the customer premises equipment, the at least one transport including at least one of broadcast, unicast, multicast, torrent, peer-to-peer, and mesh architecture.

3. The customer premises equipment according to claim 1, wherein a subscriber content price for the multimedia content is based on a time/date the multimedia content is scheduled to be viewed with the customer premises equipment.

4. The customer premises equipment according to claim 1, wherein:
   the receiver further receives a subscriber content price for the multimedia content based on at least one of selecting multimedia content for viewing, selecting a time/date for viewing of the multimedia content, and modifying at least one of a time/date the multimedia content is scheduled to be viewed, a scheduled lead-time of electronic delivery, a maximum price for a billing period, an allowed amount of advertising to be inserted in the multimedia content, a multimedia content resolution, and targeted, non-targeted, and subscriber requested advertising types to be inserted into the multimedia content; and
   the customer premises equipment further comprising a user interface to display the subscriber content price for the multimedia in response to the modification.

5. The customer premises equipment according to claim 1, wherein:
the receiver further receives decryption information and unique re-encryption information associated with the customer premises equipment and receives, in response to a subscriber request to play the multimedia content, a unique decryption key to decrypt the multimedia content; and
the customer premises equipment further decrypts and uniquely re-encrypts the multimedia content prior to storing the multimedia content.

6. The customer premises equipment according to claim 1, further comprising a user interface to present a reduced subscriber content price based on an advertising subsidy associated with a subscriber selected amount of advertising to be viewed with the multimedia content, the advertising subsidy being based on at least one of a value of a cluster of subscribers to an advertiser and a value of an individual subscriber to the advertiser.

7. The customer premises equipment according to claim 1, wherein the receiver further transmits, to a gateway device, subscriber interaction with the customer premises equipment comprising at least one of time/date of multimedia content selection, the selected subscriber content price, viewing of the subscriber content prices, selection of scheduled lead-time of electronic delivery of multimedia content, time/date of the start and completion of the multimedia content viewing, multimedia content viewing period functions comprising at least one of pause/resume, fast forward/rewind, and adskip, and modifying at least one of a maximum price for a billing period, an allowed amount of advertising to be inserted in the multimedia content, a multimedia content resolution, and targeted, non-targeted, and subscriber requested advertising types to be inserted into the multimedia content.

8. The customer premises equipment according to claim 1, wherein: the customer premises equipment is at least partially implemented with at least one of a carrier supplied customer premise equipment, a digital video recorder, a set top box, a video extender, a smart television, a personal computer, a tablet computer, a smart phone, and a software app.

9. The customer premises equipment according to claim 1, wherein the receiver receives a subscriber content price for the multimedia content based on a scheduled lead time of electronic delivery of the multimedia content via at least one transport provider servicing the customer premises equipment, and receives a scheduled delivery of the multimedia content within the scheduled lead-time in response to a subscriber request to deliver the multimedia content to the customer premises equipment.

10. The customer premises equipment according to claim 1, wherein the multiplexed multimedia content and advertisement releases at least one of bandwidth and radio frequency spectrum for other multimedia content other than the multimedia content and the advertisement.

11. A method equipment, comprising:
receiving, with a receiver of a customer premises equipment, multiplexed multimedia content and advertisement, and an insertion instruction, the multiplexed multimedia content and advertisement being received over a reduced number of broadcast channels reduced from a greater number of broadcast channels greater than the reduced number of broadcast channels, and the multiplexed multimedia content and advertisement eliminating repetition of the advertisement within the reduced number of broadcast channels;
demultiplexing, with a video demultiplexor, the received multiplexed multimedia content and advertisement from the reduced number of broadcast channels to produce a multimedia content and an advertisement;
storing, with a storage device, the multimedia content and the advertisement;
retrieving, with an assembly engine, the multimedia content and the advertisement from a storage device;
inserting, with the assembly engine, the advertisement into the multimedia content based on the insertion instruction; and
outputting, to a display device, the multimedia content and the advertisement.

12. The method according to claim 11, wherein the receiver receives the multiplexed multimedia content and advertisement, and the insertion instruction, via at least one transport provider servicing the customer premises equipment, the at least one transport including at least one of broadcast, unicast, multicast, torrent, peer-to-peer, and mesh architecture.

13. The method according to claim 11, wherein a subscriber content price for the multimedia content is based on a time/date the multimedia content is scheduled to be viewed with the customer premises equipment.

14. The method according to claim 11, further comprising:
receiving, with the receiver, a subscriber content price for the multimedia content based on at least one of selecting multimedia content for viewing, selecting a time/date for viewing of the multimedia content, and modifying at least one of a time/date the multimedia content is scheduled to be viewed, a scheduled lead-time of electronic delivery, a maximum price for a billing period, an allowed amount of advertising to be inserted in the multimedia content, a multimedia content resolution, and targeted, non-targeted, and subscriber requested advertising types to be inserted into the multimedia content; and
displaying, with a user interface, the subscriber content price for the multimedia in response to the modification.

15. The method according to claim 11, further comprising:
receiving, with the receiver, decryption information and unique re-encryption information associated with the customer premises equipment and receives, in response to a subscriber request to play the multimedia content, a unique decryption key to decrypt the multimedia content; and
decrypting and uniquely re-encrypting, with the customer premises equipment, the multimedia content prior to storing the multimedia content.

16. The method according to claim 11, further comprising presenting, with a user interface, a reduced subscriber content price based on an advertising subsidy associated with a subscriber selected amount of advertising to be viewed with the multimedia content, the advertising subsidy being based on at least one of a value of a cluster of subscribers to an advertiser and a value of an individual subscriber to the advertiser.

17. The method according to claim 11, further comprising transmitting, with the receiver, and to a gateway device, subscriber interaction with the customer premises equipment comprising at least one of multimedia content selection, the selected subscriber content price, viewing of the subscriber content prices, selection of multimedia content lead-time, time/date of the start and completion of the multimedia content viewing, and multimedia content viewing period functions comprising at least one of pause/resume, fast forward/rewind, and adskip, and modifying at least one of a maximum price for a billing period, an allowed amount of advertising to be inserted in the multimedia content, a multimedia content resolution, and targeted, non-targeted, and subscriber requested advertising types to be inserted into the multimedia content.

18. The method according to claim 11, wherein the customer premises equipment is at least partially implemented with at least one of a carrier supplied customer premise equipment, a digital video recorder, a set top box, a video extender, a smart television, a personal computer, a tablet computer, a smart phone, and a software app.

19. The method according to claim 11, further comprising:
  receiving, by the receiver, a subscriber content price for the multimedia content based on a scheduled lead time of electronic delivery of the multimedia content via at least one transport provider servicing the customer premises equipment; and
  receiving, by the receiver, a scheduled delivery of the multimedia content within the scheduled lead-time in response to a subscriber request to deliver the multimedia content to the customer premises equipment.

20. The method according to claim 11, further comprising:
  releasing, with the multiplexed multimedia content and advertisement, at least one of bandwidth and radio frequency spectrum for other multimedia content other than the multimedia content and the advertisement.

* * * * *